US010628761B1

(12) United States Patent
Bion et al.

(10) Patent No.: US 10,628,761 B1
(45) Date of Patent: Apr. 21, 2020

(54) GRAPHICAL USER INTERFACE FOR DISPLAYING TIPS TO HOSTS PROVIDING TIME EXPIRING LISTINGS IN A RESERVATION SYSTEM

(71) Applicant: Airbnb, Inc., San Francisco, CA (US)

(72) Inventors: Ricardo Augusto Shih Hoffmann Bion, Oakland, CA (US); Carla Pellicano, San Francisco, CA (US); Lenny Rachitsky, San Francisco, CA (US); Vaughn Quoss, San Francisco, CA (US); Li Zhang, Palo Alto, CA (US); Matthew Farag, San Francisco, CA (US); Trina Barretto, San Carlos, CA (US)

(73) Assignee: Airbnb, Inc., San Francisco, CA (US)

( * ) Notice: Subject to any disclaimer, the term of this patent is extended or adjusted under 35 U.S.C. 154(b) by 283 days.

(21) Appl. No.: 15/728,992

(22) Filed: Oct. 10, 2017

Related U.S. Application Data

(63) Continuation of application No. 14/736,147, filed on Jun. 10, 2015, now Pat. No. 9,811,785.

(60) Provisional application No. 62/166,440, filed on May 26, 2015.

(51) Int. Cl.
*G06Q 10/00* (2012.01)
*G06Q 10/02* (2012.01)
*G06Q 30/06* (2012.01)
*G06T 11/20* (2006.01)

(52) U.S. Cl.
CPC ......... *G06Q 10/02* (2013.01); *G06Q 30/0635* (2013.01); *G06T 11/206* (2013.01); *G06T 2200/24* (2013.01)

(58) Field of Classification Search
CPC .......................... G06Q 10/02; G06Q 30/0635
USPC ...................................................... 705/5, 16
See application file for complete search history.

(56) References Cited

U.S. PATENT DOCUMENTS

| | | | |
|---|---|---|---|
| 867,663 A | 10/1907 | Körner | |
| 7,774,226 B2 * | 8/2010 | Kalagnanm | ........ G06Q 10/0637 705/7.31 |
| 9,660,971 B1 * | 5/2017 | Latin-Stoermer | ....... H04L 63/08 |
| 2005/0004819 A1 | 1/2005 | Etzioni et al. | |

(Continued)

OTHER PUBLICATIONS

PCT International Search Report and Written Opinion, PCT Application No. PCT/US2015/062771, dated Feb. 12, 2016, 10 pages.

(Continued)

*Primary Examiner* — Rokib Masud
(74) *Attorney, Agent, or Firm* — Fenwick & West LLP

(57) ABSTRACT

This disclosure includes methods for displaying tips to hosts in a reservation system. The reservation system collects viewing data upon receiving viewing requests from potential guests to view a listing in the reservation system. The reservation system associates the viewing data with the listing. The reservations system applies a set of conditional expressions and calculations to the viewing data of the listing to compare the listing to a peer group of similar listings for each time interval in an evaluation time range. In some embodiments, a GUI is presented to the host of the subject listing comprising a histogram of the number of views of the subject listing, an indication of the number of views of the peer group of the subject listing, and region for displaying tips to the host of the subject listing.

20 Claims, 17 Drawing Sheets

(56) References Cited

U.S. PATENT DOCUMENTS

| | | | |
|---|---|---|---|
| 2005/0065838 A1 | 3/2005 | Kalagnanm et al. | |
| 2008/0222132 A1* | 9/2008 | Pan | G06F 16/9535 |
| 2009/0012955 A1* | 1/2009 | Chu | G06Q 30/0261 |
| 2009/0143977 A1* | 6/2009 | Beletski | G01C 21/362 |
| | | | 701/533 |
| 2011/0295722 A1 | 12/2011 | Reisman | |
| 2012/0116844 A1* | 5/2012 | Menich | G06Q 30/0202 |
| | | | 705/7.31 |
| 2014/0067469 A1 | 3/2014 | Bosworth et al. | |
| 2014/0278591 A1 | 9/2014 | Blecharczyk et al. | |
| 2014/0324843 A1* | 10/2014 | Rapoport | G06F 16/58 |
| | | | 707/724 |
| 2016/0055505 A1* | 2/2016 | Rana | G06Q 30/0206 |
| | | | 705/5 |

OTHER PUBLICATIONS

Canadian Office Action, Canadian Application No. 2,968,667, dated Mar. 13, 2018, 4 pages.
United States Office Action, U.S. Appl. No. 14/952,576, dated May 17, 2019, 22 pages.

* cited by examiner

GRAPHICAL USER INTERFACE FOR DISPLAYING TIPS TO HOSTS PROVIDING TIME EXPIRING LISTINGS IN A RESERVATION SYSTEM

CROSS REFERENCE TO RELATED APPLICATIONS

This application is a continuation of prior, co-pending U.S. application Ser. No. 14/736,147, filed on Jun. 10, 2015, which claims the benefit of U.S. Provisional Application No. 62/166,440, filed May 26, 2015, both of which are incorporated by reference in their entirety.

TECHNICAL FIELD

This disclosure relates to reservation systems and in particular to automatically generating tips for hosts who wish to implement such tips in managing their listings in a reservation system.

BACKGROUND

Many online computer systems offer listings of goods and services for sale, licensing, and reservation (for simplicity, "booking" generally) that have or are associated with real world locations that have intangible value to the prospective consumer. Online accommodations and reservations systems (referred to herein as reservation systems) provide a suitable example. Reservation systems match potential guests looking for accommodation with hosts offering different and varied accommodations. In order to match a potential guest to a host, a reservation system stores and outputs a listing created by a host for an accommodation. The host provides details about the accommodation, its availability, and its price. Because the hosts are separate entities not under control by the reservation system, the availability, the quality of the provided details, the listing content and the price of the accommodation are ultimately decided by the host providing the accommodation. As a result, the accommodations may have prices, availabilities, or provided details that do not result in the accommodations being identified or booked by potential guests.

SUMMARY

An online reservation system automatically provides tips to hosts via a graphical user interface (GUI). The reservation system enables hosts to create listings with attributes such as the description of the listing, the type of the listing, the price of the listing, the availability of the listing, and other similar attributes. The attributes selected by a host control the placement of such listings in search results, and whether the listings are ultimately booked by guests. The reservation system is configured to automatically process the listing and surface informational tips to hosts, which hosts can in turn use to selectively change the attributes of their listings to increase the likelihood of a listing being booked. By providing tips, the reservation system can empower hosts to make informed decisions and improve utilization, revenue, or other goals for listings if the tips are followed by the host.

Tips are determined on a per time interval basis using a set of conditional expressions and calculations, which may take any of viewing data, listing data, or host data as inputs. Viewing data is generated when guests submit viewing requests for the subject listing. The tips for a subject listing are also based on viewing data collected from a peer group of similar listings to the subject listing determined by the reservation system. A peer group of listings is identified by comparing attributes between listings such as the listing type, listing location, listing price. In addition to the viewing data, the reservation system also uses attributes of the listing and data about the activities of the host of the listing to generate tips.

The reservation system is configured to provide different types of tips, including price tips and availability tips. Each tip type has corresponding conditional expressions which are applied to each time interval. If a time interval satisfies a conditional expression corresponding to a particular tip type, that time interval is marked with that tip type. When multiple consecutive time intervals are marked with the same tip type they are grouped as a tip period. Each tip is therefore associated with a tip period.

A tip for a tip period is displayed in the GUI. In one embodiment, the tip GUI includes a histogram divided into time intervals and tip region for displaying tips for a subject listing. The histogram displays a graphical representation (e.g. a bar or line) representing the number of viewing requests in the viewing data for the subject listing that have desired reservation times that include the time interval. Each of the time intervals corresponding to the tip period are highlighted on the histogram in conjunction with the display of a description of the tip in the tip region.

The graphical representation of views of the subject listing for each time interval are displayed concurrently with a graphical representation of the average number of views for listings similar to the subject listing. Therefore, the histogram provides a visual comparison of the views received by the reservation system for the subject listing with views received for the similar listings. In addition to the graphical representation of the views received for each time interval, the histogram may also have an indication of the availability of the listing corresponding to each time interval. Providing a visual comparison of the number of views of the subject listing relative to similar listings for each time interval enables the host to determine the relative interest by guests in the subject listing as compared to other listings.

The tip region may also contain an implementation icon, which is a graphical mechanism that activates program code to implement the tip automatically upon receiving an interaction from a user by changing attributes of the subject listing in accordance with the tip, such as altering the price, available dates, or other attributes of the subject listing. The tip region is configured to receive a user interaction with the implementation icon and, in response, to automatically access the listing in a database and change particular attributes of the listing. For example, where a price tip for a listing is made, such as to reduce the price, a selection of the implementation icon by the host results in the reservation system automatically updating the price of the listing in the database. Similarly, where the tip is an availability tip, a selection of the implementation icon by the host results in the reservation system automatically updating the available dates for the listing.

BRIEF DESCRIPTION OF THE DRAWINGS

FIG. 13 is an illustration of an additional tip interface displaying an indication of a relative likelihood of receiving a reservation request in accordance with one embodiment.

FIG. 14 is an illustration of an additional tip interface displaying price tips on multiple days in accordance with one embodiment.

FIG. 15 is an illustration of an additional tip interface displaying price tips for a whole month in accordance with one embodiment.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

I. System Overview

Figure 1:
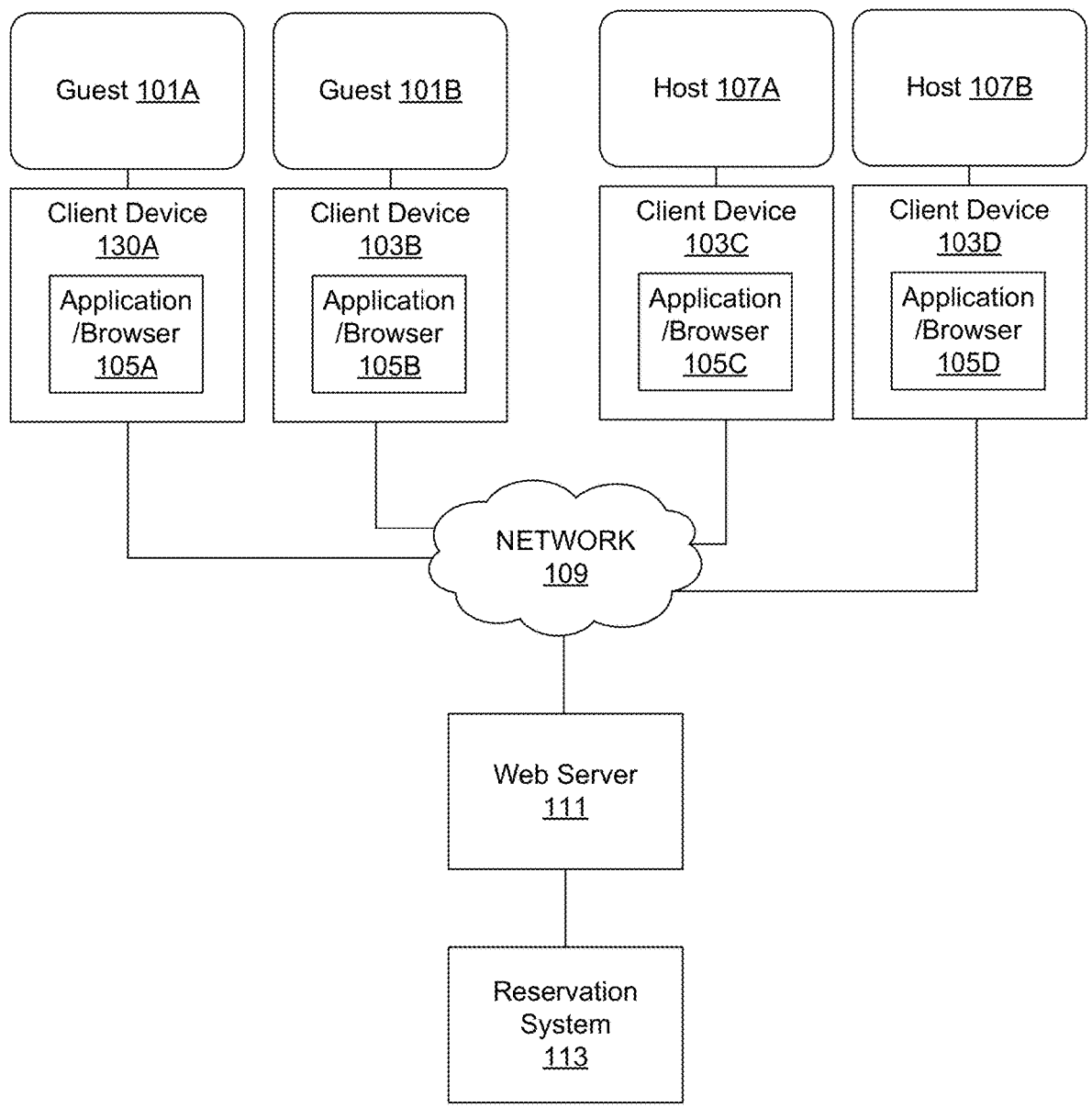
FIG. 1 is a block diagram of a computing environment including a reservation system in accordance with one embodiment.

FIG. 1 is a block diagram of a computing environment including a reservation system in accordance with one embodiment. The network 109 represents the communication pathways between potential guests, those people wishing to reserve a listing, and hosts, those providing the listing, and the web server 111 configured to implement the reservation system 113. In one embodiment, the network is the Internet. The network can also utilize dedicated or private communication links (e.g. wide area networks (WANs), metropolitan area networks (MANs), or local area networks (LANs)) that are not necessarily part of the Internet. The network uses standard communications technologies and/or protocols.

The client devices 103 are used by the guests and hosts for interacting with the reservation system 113. A client device 103 executes an operating system, for example, a Microsoft Windows-compatible operating system (OS), Apple OS X or iOS, a Linux distribution, or Google's Android OS. In some embodiments, the client device 103 may use a web browser 105, such as Microsoft Internet Explorer, Mozilla Firefox, Google Chrome, Apple Safari and/or Opera, as an interface to interact with the reservation system 113. In other embodiments, the client device 103 may execute a dedicated application for accessing the reservation system 113.

The reservation system 113 includes web server 111 that provides web pages or other web content that form the basic graphical user interface visible to the guests and a different graphical user interface visible to hosts to manage their listings. Guests and hosts use respective client devices 103 to access one or more web pages, and interact with the reservation system 113 via the interface.

The reservation system 113 may be, for example, a dining reservation system, a rideshare reservation system, an accommodation reservation, and the like. More generally, the reservation system 113 provides guests with ability to request to reserve listings provided by hosts. The real world, physical location of each listed accommodation or service is generally considered as a factor in the guest's decision to reserve the provided listing. Other example factors include the listing type, the identity of the host providing the listing, and reviews written by guests who have previously reserved the listing offered by the host.

The reservation system 113 facilitates transactions between guests and hosts. For example, an accommodation reservation system allows guests to book (reserve) accommodations provided by hosts of the reservation system. A rideshare reservation system allows users 103 to book rides from one location to another, and so on. To further the goal of facilitating transactions between guests and hosts the reservation system 113 provides various functionalities to the guest as well as the host via client applications 105 operating on client devices 103. The reservation system 113 provides the guest with the ability to search and view host listings, make reservation requests, and engage in a conversation with a host using an application 105 provided electronic messaging platform. The reservation system 113 provides the host with interfaces that allow hosts to manage their listings including interfaces that provide tips to empower hosts with information they can opt to use to improve the utilization and revenue of a listing on the tip system 113. The reservation system 113 comprises additional components and modules that are described below.

II. Reservation System

Figure 2:
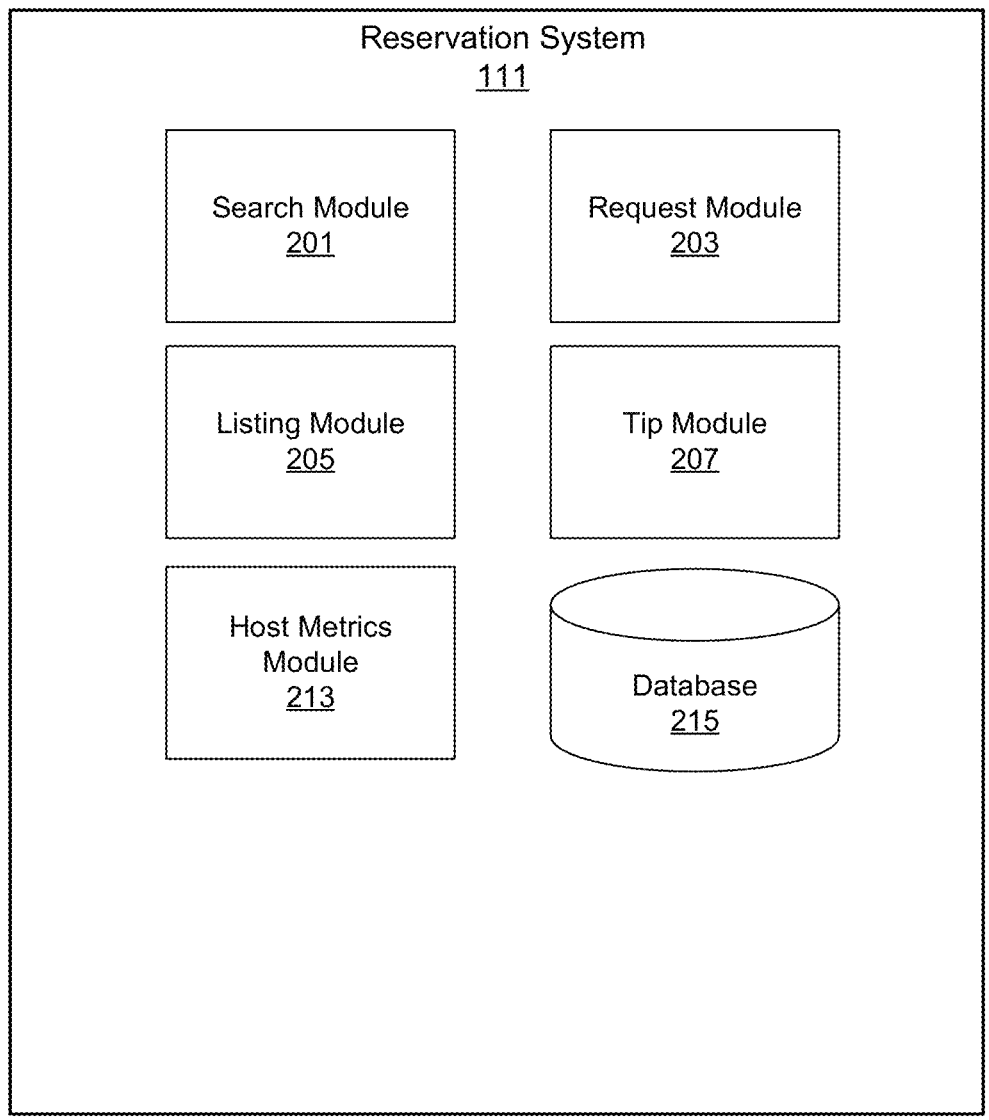
FIG. 2 is a block diagram of the logical components of the reservation system in accordance with one embodiment.

FIG. 2 is a block diagram of the logical components of the reservation system, in accordance with one embodiment. The reservation system 113 comprises a search module 201, a request module 203, a listing module 205, a tip module 207, a host metrics module 213, and a database 215. Each of the aforementioned modules is described in a following section pertaining to its function in the reservation system 113. Those of skill in the art will appreciate that these modules are not components of a generic computer system. Those of skill in the art will further appreciate that the reservation system 113 may also contain different and other modules that are not described herein. In addition, conventional elements, such as firewalls, authentication systems, payment processing systems, network management tools, load balancers, and so forth are not shown as they are not material to the invention.

The reservation system 113 may be implemented using a single computer, or a network of computers, including cloud-based computer implementations. The computers are preferably server class computers including one or more high-performance CPUs and 1G or more of main memory, and running an operating system such as LINUX or variants thereof. The operations of the system 113 as described herein can be controlled through either hardware or through computer programs installed in non-transitory computer storage and executed by the processors to perform the functions described herein. The database 215 is implemented using non-transitory computer readable storage devices, and suitable database management systems for data access and retrieval. The system 113 includes other hardware elements necessary for the operations described herein, including network interfaces and protocols, input devices for data entry, and output devices for display, printing, or other presentations of data. Additionally, the operations listed here are necessarily performed at such a frequency and over such a large set of data that they must be performed by a computer in order to be performed in a commercially useful amount of time, and thus cannot be performed in any useful embodiment by mental steps in the human mind.

Figure 3:
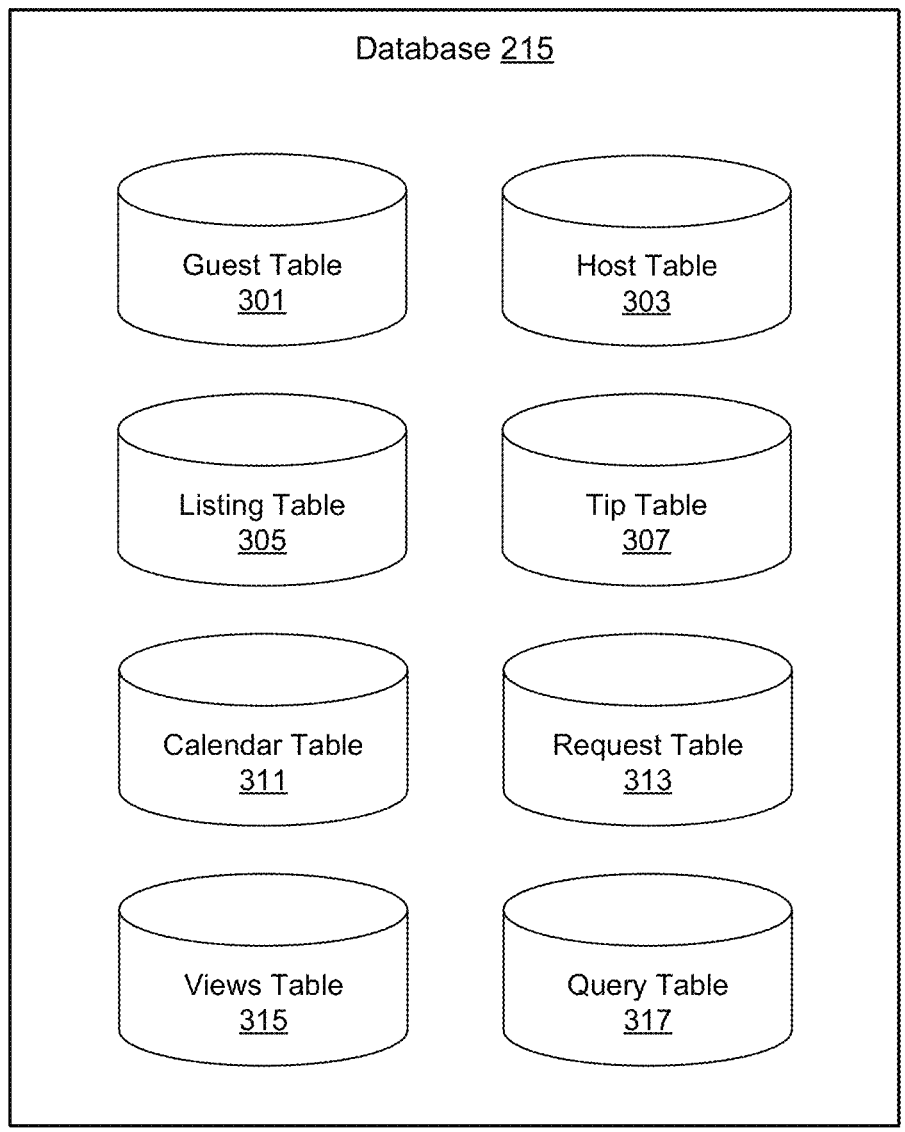
FIG. 3 is a block diagram illustrating example tables within an example database associated with the reservation system in accordance with one embodiment.

FIG. 3 is a block diagram illustrating example tables within an example database associated with the reservation system 113 in accordance with one embodiment. In one embodiment the database 215 comprises a guest table 301, a host table 303, a listing table 305, a tip table 307, a calendar table 311, a request table 313, a viewing table 315, and a query table 317. Each of the aforementioned tables is described in a following section pertaining to its usage by the reservation system 113. Those of skill in the art will appreciate that these tables are not components of a generic database, and that database 215 may contain other tables that are not described herein. The database may be implemented using any suitable database management system such as MySQL, PostgreSQL, Microsoft SQL Server, Oracle, SAP, IBM DB2, or the like.

III. Data Model

Figure 4:
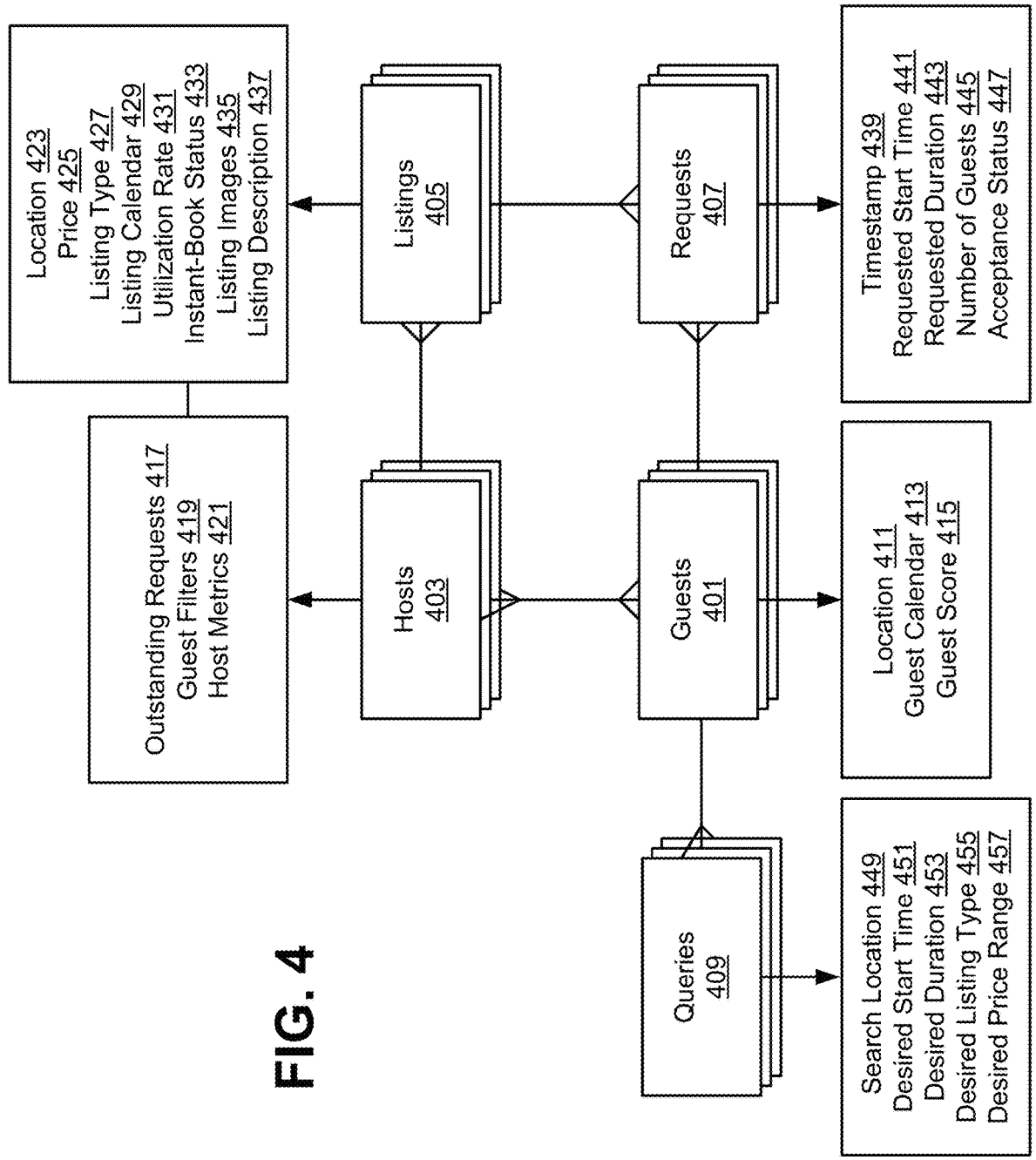
FIG. 4 is a block diagram of an example data model for use with the reservation system in accordance with one embodiment.

FIG. 4 is an illustration of an example object-oriented class diagram of class objects that may be used to implement the reservation system 113 according to one embodiment. The objects include guest objects 401, host objects 403, listing objects 405, request objects, and query objects. The lines in between the boxes representing each object represent the relationships between each object. In the interest of brevity, guest objects 401 may be referred to simply as guests 401, host objects 403 may be referred to as hosts 403, and so forth. Each of the aforementioned objects is described in a following section pertaining to its usage by the reservation system 113. The objects of FIG. 4 are examples of computer data structures (e.g., a data model) implemented in the reservation system 113 and database 215 in order to store the data of the reservation system 113.

III.A Guests in a Reservations System

Each guest is represented in the reservation system 113 by an individual guest object 401 having a unique guest ID stored in guest table 301. A guest object 401 is also referred to as a guest profile. The guest object 401 includes a number of guest related attribute fields including a profile picture or other identifying information, a location 415, and a guest calendar 417. The reservation system 113 allows each guest to communicate with multiple hosts. Between any given host and guest pair, reservation requests and other communications may be exchanged. The reservation system 113 also enables guests to search and view listings 305 provided by hosts in the reservation system 113.

The guest location 415 is either a guest's current physical location (e.g., based on information provided by their client device 103), or their home address, neighborhood, city, state, or country of residence. The guest location 415 that may be used to filter search criteria relevant to a particular guest or assign default language preferences. The guest calendar 417 is an entry in the calendar table 311 corresponding to the times that listings have been reserved by the guest. The guest calendar 417 is updated whenever the guest makes a new listing reservation. The guest calendar 417 is accessed by either the guest or the reservation system 113 to determine where the guest has stayed or will be staying.

III.B Hosts in a Reservation System

Each host is assigned an individual host object 403, with a unique ID, which represents the host in the reservation system 113. A host object 403 is also referred to as a host profile. Host objects 409 are stored by the reservation system 113 in the host table 303. A host object 409 is associated with one or more listings 405. The host object 403 is composed of a number of host attributes including outstanding requests 423, guest filters 425, and host metrics 429.

A guest may submit a request 407 to book a listing 405. The reservation system 113 tracks these requests 407 and maintains for each host a list of outstanding requests 423 to which the host has not yet responded. This list is maintained by the request module 203 so as to be able to notify the host of requests that need responses and is also used by the host standards module 213 to calculate particular host metrics 429.

Guest filters 425 are settings configured by the host that the search module 201 uses to prevent potential guests from viewing the host's listings 405 in the reservation system's 113 search results and/or sending requests to the host regarding the host's listings. For example, a host may want to avoid guests that have a guest score under a threshold value and so the host might set a guest filter preventing guests under the threshold guest score value from viewing the host's listings 405. Additionally, the guest filters 425 may indicate the times at which the host can be contacted by a potential guest, how far in advance the reservations must be booked, or any other preference of the host that may result in the exclusion of guests. With respect to tips, these guest filters 425 limit a host's interactions with guests thereby excluding some guests from reserving the host's listings and so the reservation system may inform a host that making changes to their guest filters may be beneficial in reaching the goals of the host.

The host metrics module 213 comprises program code that calculates host metrics 429 for each host object 403 in the reservation system 113 and updates host metrics 429 periodically or continuously. The host metrics module 213 parses communications (including requests 407) between the host and potential guests to calculate metrics for that host. Data from the host's communications with potential guests are recorded by the host metrics module 213 may then be used to calculate an acceptance rate, a response rate, a number of consecutive non-responses, an average response time of the host, or the like. This list of host metrics 429 is not exhaustive and other descriptive metrics may be a suitable addition to this list if they are correlated with some aspect of host behavior.

The consecutive non-responses metric is a count of the number of consecutive communications from guests to which the host has not responded starting from the current date and moving backwards in time. For example, if the host has not responded to the last two communications received by the host the consecutive non-responses metric would be equal to 2. The consecutive non-responses metric may be calculated such that the host metrics module 213 only counts cases where the host does not respond at all or a non-response may be counted if the host does not respond within a particular response time threshold (e.g. 24 hours).

The average response time metric is an average of a host's response time to requests or other types of communications from guests related to all listings of a host. The average response time metric may be calculated for the lifetime of the host in the reservation system or over some shorter time interval (e.g. last 30 days).

The response rate of a host is the number of responses of the host to reservation requests or other types of communications from guests divided by the total number of attempted communications by guests with the host for all listings of the host. The response rate metric may be calculated for the lifetime of the host in the reservation system or over some shorter time interval (e.g. last 30 days).

The acceptance rate of a host is a ratio of the number of acceptances by the host of reservation requests made by guests to the total number of requests made by guests for all listings of the host. The acceptance rate metric may be calculated for the lifetime of the host in the reservation system or over some shorter time interval (e.g. last 30 days).

A user can be both a host and a guest. In this case, the user will have a profile entry in both the guest table 301 and the host table 303 and represented by both a guest object 401 and host object 403. Embodiments of the reservation system 113 may combine the guest table 301 and the host table 303 into a single user profile store. The user profile store will then store the personal information as well as any guest related information and host related information if applicable. This scheme reduces the amount of redundant information between the guest store 301 and the host store 303 when a user utilizes the reservation system to both offer and reserve listings.

III.C Listings in a Reservation System

The listing module 205 comprises program code that provides a user interface and processing logic for hosts to list goods or services for purchase or booking to other users, and is one means for doing so. Where the reservation system 113 is an accommodation reservation system, the listing module 205 is configured to provide a user interface suitable for listing accommodations, such as houses, apartments, condominiums, rooms, or other types of lodgings. Where the reservation system 113 is a dining reservation system, then the listing module 205 is configured to provide a user interface for listing available reservations at restaurants, entertainment venues, resorts, etc. Where the reservation system 113 is a rideshare reservation system, then the listing module 205 is configured to provide a user interface for listing available rides.

The listing module 205 is configured to receive a listing from a host describing the resource being offered, a time frame of its availability, a price, a location, and other relevant factors. For example, for an accommodation reservation system, a listing includes a type of accommodation (e.g. house, apartment, room, sleeping space, other), a representation of its size (e.g., square footage, or number of rooms), the dates that the accommodation is available, and a price (e.g., per night, week, month, etc.). The listing module 205 allows the user to include additional information about the good or service, such as videos, photographs and other media.

Upon receiving a listing from a host, the listing module 205 creates a listing object 405, which represents the particular resource provided by the host, e.g., an individual space or real estate properties offered by an accommodation system. Each listing object 405 is associated with the host object 403 for the host providing the listing and is assigned a unique listing ID. A listing object is comprised of at least a listing location 423, price 425, listing type 427, a listing calendar 429, a listing utilization rate 431, an instant-book status 433, listing images 435, and a listing description 437. The listing table 305 stores information about listings offered by hosts and may contain additional information such as a short description of the listing, a list of rules, photographs, etc. described above.

Location 423 identifies the geographic location of the listing, such as the complete address, neighborhood, city, and/or country of the offered listing. The listing module 203 is also capable of converting one type of location information (e.g., mailing address) into another type of location information (e.g., country, state, city, and neighborhood) using externally available geographical map information. Price 425 is the amount of money a guest needs to pay in order to obtain the listing. The price 425 may be specified as an amount of money per day, per week, per day, per month, and/or per season, or other interval of time specified by the host. Additionally, price 425 may include additional charges such as cleaning fee, pet fee, and service fees. Listing type 427 describes the type of listing being offered by the host. For example, in an accommodation reservation system a listing type 427 is classified by unit type into two groups, room type and property type. Types of room include entire home or apartment, private room, and shared room. Types of property include apartment, house, bed & breakfast, cabin, room, and the like.

Each listing object 405 has an associated listing calendar 429. The listing calendar 429 stores the availability of the listing for each time interval in a time period, as specified by the host or determined automatically (e.g., through a calendar import process). That is, a host accesses the listing calendar 429 for a listing, and manually indicates which time intervals that the listing is available for booking by a guest, which time intervals are blocked from booking by the host, and which time intervals are already booked by a guest. In addition, the listing calendar 429 continues to store historical information as to the availability of the listing by identifying which past time intervals were booked, blocked, or available. Further, the listing calendar 429 may include calendar rules, e.g., the minimum and maximum number of nights allowed for the listing. Information from each listing calendar 429 is stored in the calendar table 311, which stores information indicating the availability of every listing. Each host is responsible for updating the listing calendar 429 for every listing 405 they post in the reservation system 113. This information is used to form the calendar table 311.

III.D Request Module

The request module 203 comprises program code configured to enable guests to submit contractual offers to reserve a listing 405 for a period of time, and is one means for performing this function. In operation, the request module 203 receives a request from a guest to reserve a listing offered by a particular host. A request is a standardized reservation request form that is sent by the potential guest, which may be modified by responses to the request by the host, either accepting or denying a received request form, such that the agreeable terms are reached between the host and the guest. Modification to a received reservation request may include, for example, changing the date, price, or reservation time of a reservation, The standardized forms may require the guest to record their reservation start time 441, reservation duration 443 (or reservation end time), number of guests 445, or any other details that must be included for an acceptance to be binding without further communication. The request module 203 receives the filled out form from the guest and presents the completed request form including the reservation parameters to the host associated with the listing 405. The host may accept the reservation request, reject the reservation request, or provide a proposed alternative that modifies one or more of the reservation parameters. If the host accepts the request (or if the guest accepts the proposed alternative), then the request module 203 updates an acceptance status 447 to indicate that the reservation request was accepted. The guest calendar 413 and listing calendar 429 are also updated to reflect that the listing 405 has been reserved by the guest.

The request table 313 stores reservation requests made by guests, and is one means for performing this function. Each reservation request is represented by request object 407, as explained with respect to FIG. 4. The reservation request may include a timestamp 439, a requested start time 441, a requested duration 443 or reservation end time, and a number of guests 445. Because the acceptance of a reservation request by a host is a contractually binding agreement with the guest that the host will provide the listing to the guest at the specified times, all of the information that the host needs to approve such an agreement are included in a reservation request. A host response to a reservation request is comprised of a value indicating acceptance or denial 447 and a timestamp 439.

The timestamp 439 of a request 407 indicates the time at which the request was submitted to the reservation system 113. The requested start time 441 of a request 407 is the first time interval for which the guest requests a host's listing 405. The requested duration 443 of a request 407 is the requested duration of use of the listed good or service. Alternatively, the reservation request form may require a requested reservation end time. Number of guests 445 stipulates the total number of people that may be using the listing. Other attributes pertaining to the use of the listing in the context of the listings in the reservation system 113 may also be implemented as part of a reservation request.

IV. Creating Viewing Data in a Reservation System

The search module 201 comprises program code configured to receive an input search query from a guest and return a set of listings 405 that best match the input query, and is one means for performing this function. For example, for an accommodation reservation system the search query includes search parameters regarding the guest's trip, such as location (e.g., postal code, city name, and country), desired reservation times, number of guests, and the like; and the guest's listing preferences, such as listing type (single bed, room, entire building), price range, amenities, and the like. The search module 201 then retrieves all the listings that match the search query. In one embodiment, Boolean matching is used for parameters such as location and date, listing type and price range, with additional parameters used to further filter or ranks the results.

The search module 201 enables, via a graphical user interface, guests to search and view listings 405 provided by hosts in order to facilitate the reservation request process. Guests search for listings through client application 105, which allows guests to submit search queries to the reservation system 113. The search queries are saved as query objects 409 stored by the reservation system 113 in query table 317. A query 409 contains a search location 449, a desired reservation start time 451, a desired reservation duration 453, a desired listing type 455, and a desired price range 455 and may include other desired attributes of a listing. A potential guest need not provide all the parameters of the query 409 listed above in order to receive results from search module 201. The search module 201 provides a set of listings 405 in response to the submitted query 409 that fulfill the parameters of the submitted query. Upon a guest selecting a listing 405 from the returned set of listings 405 the search module 201 records viewing data for the listing associated with the parameters of the search query. The reservation system 113 may also allow guests to browse listings without submitting a search query in which case the viewing data recorded will only indicate that a guest has viewed the particular listing without any further details from a submitted search query.

The search module 201 stores viewing data for listings 405 maintained by the reservation system 113. The search module 201 records guest selections of listings for viewing. When a guest selects a listing 405 for viewing that is part of a set of listings returned by a guest query 409 the search module 201 retrieves from the query table 317 the query object 409 that resulted in the listing 405 being selected. The search module 201 then stores the relevant query information including the desired reservation start time 451 and the desired reservation duration 453 or desired end time if available as a viewing request associated with the viewed listing 405. Any query information stored in the query object 409 may be associated with the viewed listing as a viewing request. For example, the search location 449 of a query may be saved in association with the viewed listing 409 in order to aid in the determination of a peer group for that listing 409, as further described below. The desired listing type 455, the desired price range 455, and other listing attributes that are relevant to a potential guest are useful for determining tips by the tip module 207. In addition to saving the relevant query information, the time at which the guest viewed the listing is also stored in the viewing request in the view table 315.

V. Determining Tips

Figure 5:
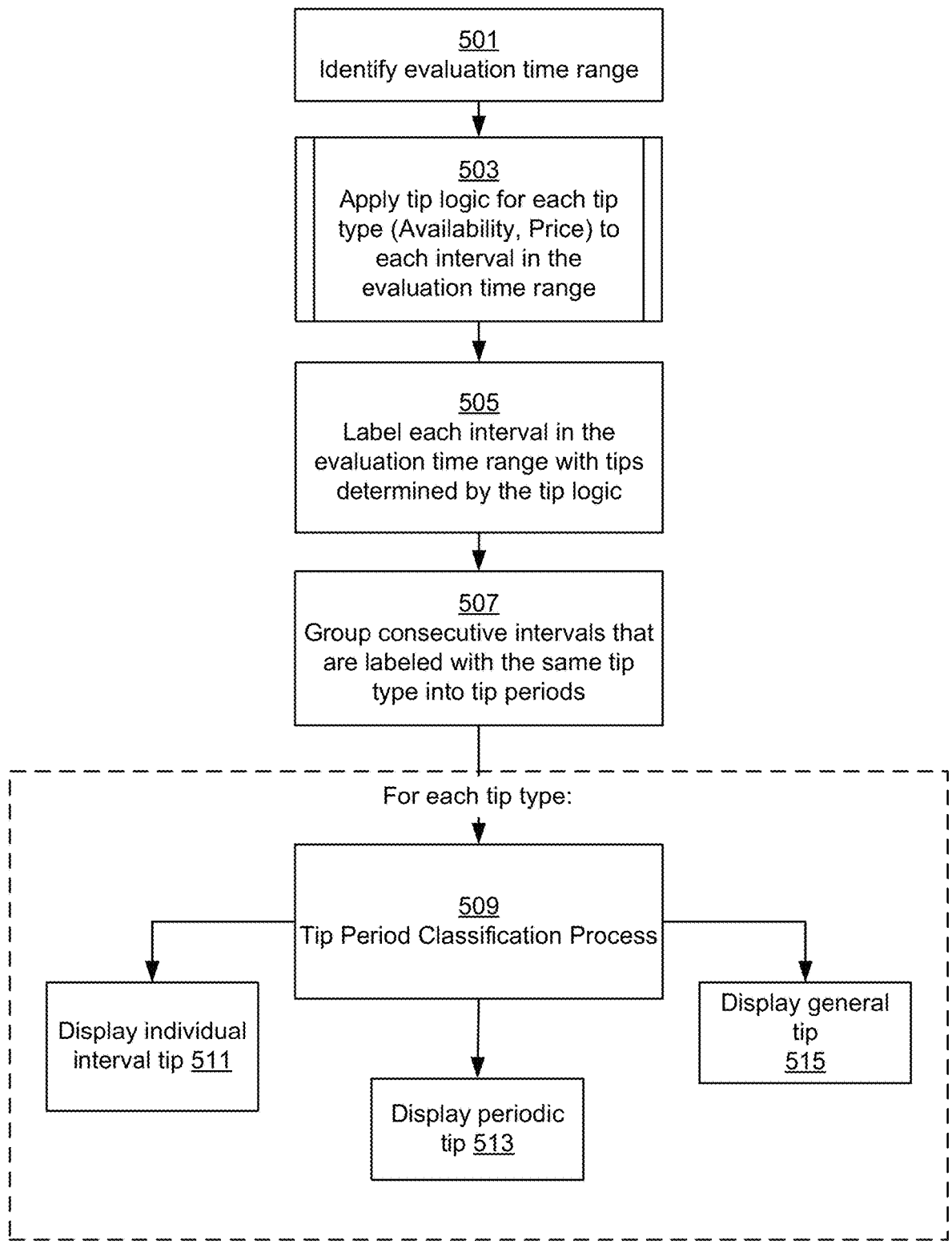
FIG. 5 is a flow diagram of a method for determining tips for a subject listing in accordance with one embodiment.

FIG. 5 is a flow diagram of a computer executed method for determining tips for a subject listing in accordance with one embodiment. The method of FIG. 5 is performed by the program code of the tip module 207 and is one means for performing the function of determining tips.

The tip module 207 first identifies 501 the evaluation time range over which tips are requested. In some embodiments, the evaluation time range is a predetermined time interval (e.g. the next 30 days from the current date). The identified time range is in the future, since tips for time already past cannot be implemented by the host of the subject listing 405. However, in some embodiments the time range may include a time in the past if non-actionable tips are enabled. For example, a tip might inform the host that improving their response rate may be beneficial to the host in reaching reservation or revenue goals if the tip module identifies that the host did not respond to reservation requests in the past. In some embodiments the identified time range is explicitly identified by the host. The task of identifying a tip time range may be completed using the tip interface illustrated in FIG. 10 by a host interacting with the displayed time intervals (e.g. by selecting the end points of an evaluation time range on a displayed histogram) as will become apparent during the discussion of FIG. 10. Upon identification of the evaluation time range the tip module divides the evaluation time range into time intervals. In some embodiments, the time intervals are the smallest reservable time unit allowed by the reservation system 113. For example, in the case of an accommodation reservation system, the smallest reservable time interval may be one day while for a vehicle reservation system the smallest reservable time may be one hour. The time interval may also be selectable by the host. The time interval allows for the evaluation of viewing data of the listing 405 and the determination of tips on a smaller time scale.

The tip module 207 is configured to provide different types of tips. The tip module 207 may be preloaded with a set of tip types configured by the operators of the reservation system 113. For example, a price tip is a set of conditional expressions and a price estimation algorithm that determines an appropriate price 425 for a listing 405. An availability tip type is a set of conditional expressions that informs hosts that a change in the availability of the listing 405 via the listing calendar 429 may improve the host's chance of receiving a reservation request. Each tip type has tip logic including a set of conditional expressions and calculations from viewing, listing or host data. Tip logic for different tip types may use the same conditional expressions or may make the same calculations. Therefore, tip logic for different tip types may share conditional expressions or calculations for more efficient tip generation.

Tip logic may also include calculations utilizing viewing and listing data from similar listings 405 to a given subject listing, referred to herein as a "peer group" of the subject listing, which may be calculated by tip module 207 as part as the tip determining process. For use in tip logic, the tip module 207 may access the data stored in database 215 from various tables including the host table 303, the listing table 305, the calendar table 311, the request table 313, the views table 315, and the query table 317 to generate tips for presentation to the host of a subject listing 405.

The peer group of a subject listing is calculated based on similarities between various listing attributes including at least location 423 and listing type 427. For example, a listing may be determined to be in the same peer group as the subject listing if the listing's location 423 is within a radius of the subject listing and it is of the same listing type 427. The radius for determining a similarity of a listing 405 based on location may be predetermined in the reservation system 113, e.g., 1 km or 1 mile. Alternatively, the radius may be inversely proportional to a density of listings in the geographic area of the subject listing (e.g. if an area is sparsely populated with listings 405 the peer group radius increases in size). In some embodiments, the radius for determining the similarity of a listing may increase until a threshold number of similar listings are found. In some embodiments, the peer group of a subject listing may be determined as other returned listings to guest queries that include the subject listing. For example, if a second listing appears frequently in search results that include the subject listing it might be considered to be in the peer group of the subject listing. In some embodiments, the peer group for the subject listing is determined based on neighborhood, district, or another officially demarcated area of land.

The tip module 207 applies 503 tip logic corresponding to each tip type to each time interval in the identified evaluation time range. For example. For example, if there are five days in the evaluation time range, and two types of tips, then the module 207 performs ten tip evaluations. For each time interval, the tip logic returns a value indicating whether a given tip type applies or not, based on the corresponding tip logic. The tip module 207 labels 505 each time interval based on the returned value from the tip logic. The labels may be binary values indicating whether a time interval qualifies for the tip type. Alternatively, depending on the tip type, the tip label may inform the host of a potentially beneficial change to the attributes of the subject listing for that time interval. Tips labeled in this manner enable immediate action to automatically implement changes to the listing attributes addressed by the tip.

Once all time intervals in the identified evaluation time range have been labeled 505, the tip module 207 traverses the time intervals in order and groups 507 consecutive time intervals that are labeled 505 with the same tip type into tip periods. For example, if the tip logic labels three consecutive days for a subject listing for the availability tip, then the three days are grouped together to form a tip period. In some cases tips of the same type may differ between time intervals. For example, a price tip may inform the host of a different price for each of a series of consecutive time intervals. In this case, the tip module 207 may group labeled time intervals based on whether the labels are substantially similar. In the example of the price tip, the tip module 207 may determine whether consecutive time intervals will be grouped based on whether the calculated prices across multiple consecutive time intervals are within a threshold monetary value. If tip labels of the same type are not substantially similar, the tip module 207 will not group the tip into a single tip period despite the fact that the consecutive time intervals are labeled with the same tip type. This circumstance may arise, for example where the tip module 207 presents different prices for different time intervals in a consecutive sequence, such as one price on Thursday, a different higher price on Friday, and further different and higher price on a Saturday, and then a lower price on a Sunday.

After the labeled time intervals have been grouped 507 into tip periods, the tip module 207 classifies each set of tip periods corresponding to each tip type. Each category corresponds to particular display style that will be output when the tip is presented to the host using the tip interface described with reference to FIG. 10 below. All the tip periods of a single tip type within an identified evaluation time range comprise a "tip."

Figure 11A:
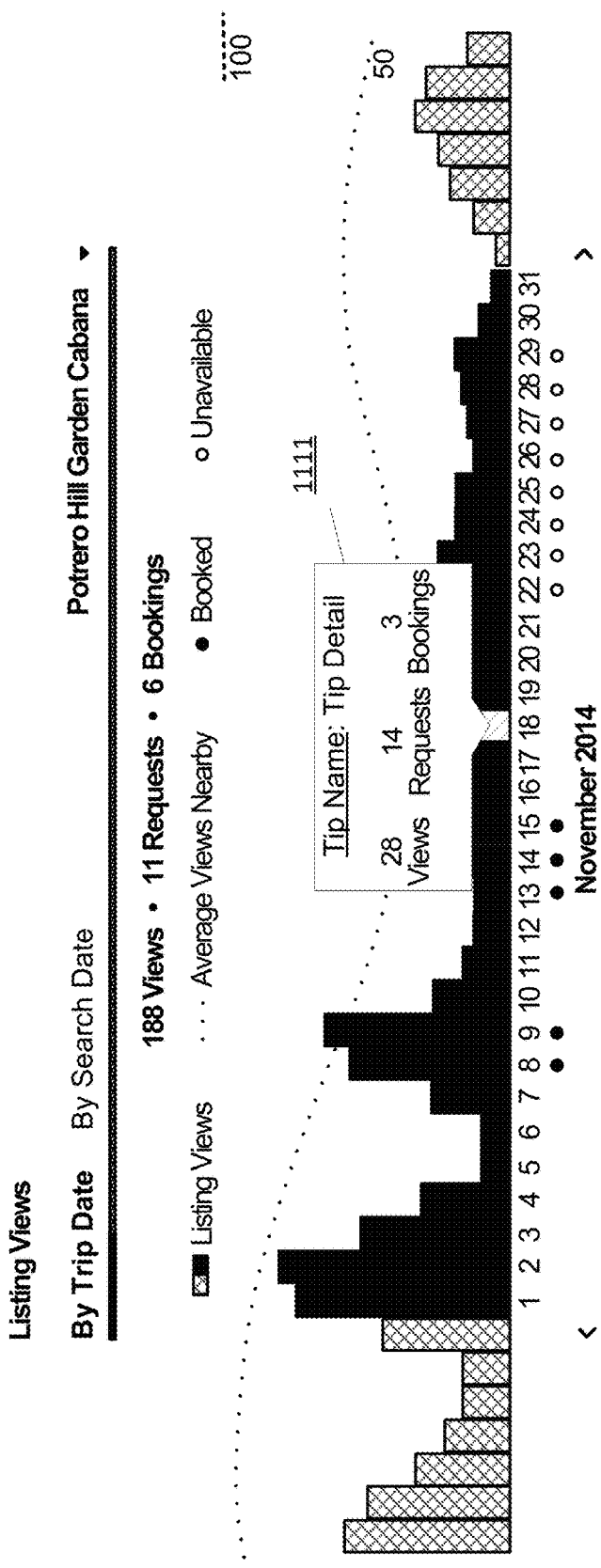
FIG. 11A is an illustration of a tip interface displaying a daily tip in accordance with one embodiment.
Figure 11A:
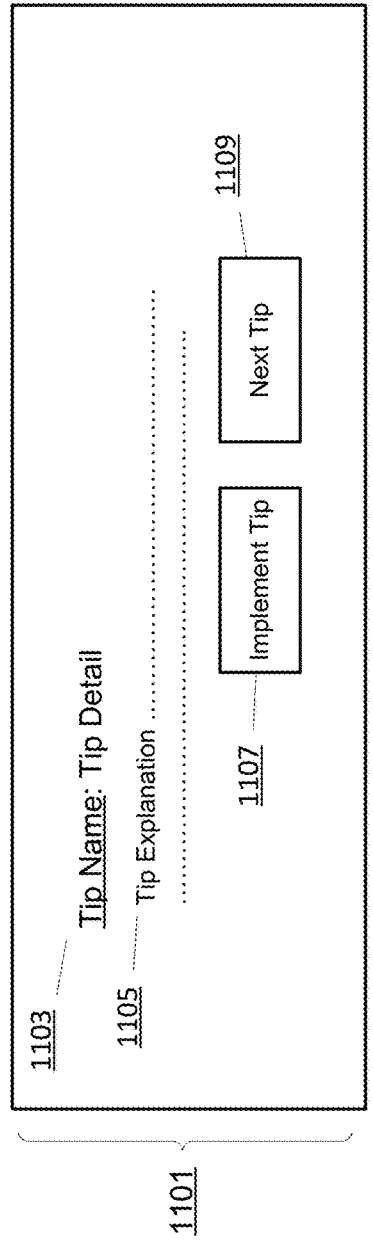
Figure 11B:
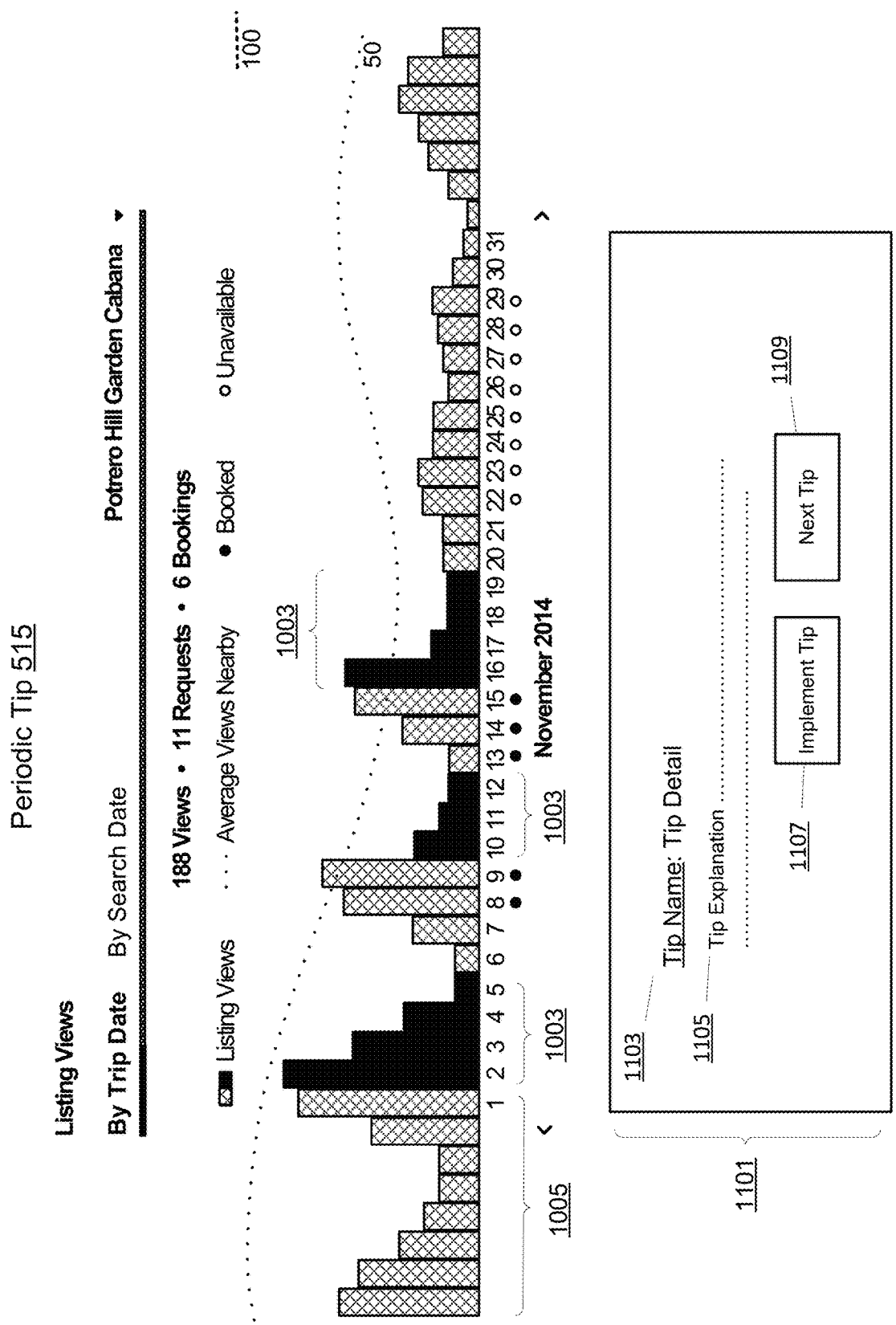
FIG. 11B is an illustration of a tip interface displaying a periodic tip in accordance with one embodiment.
Figure 11C:
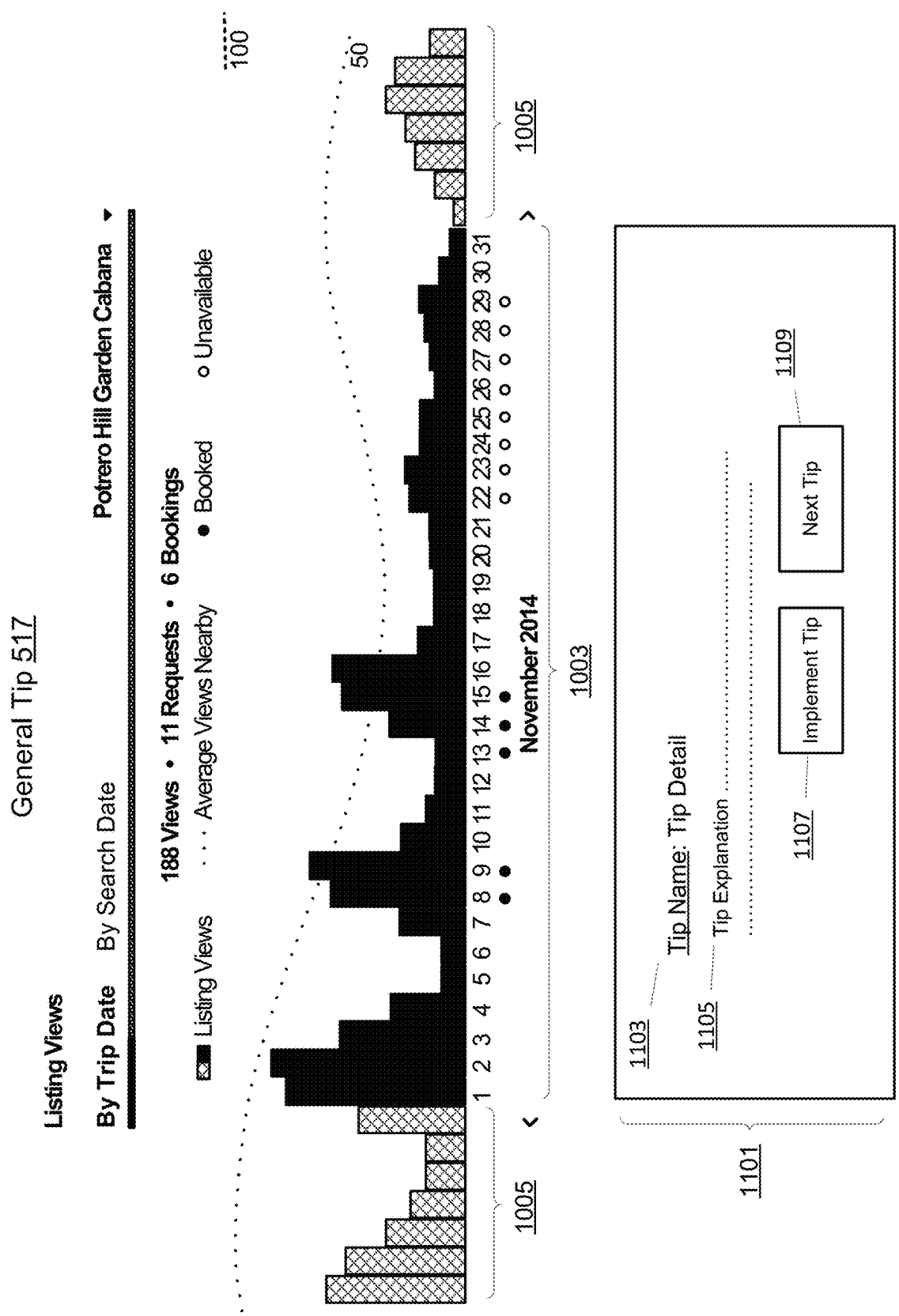
FIG. 11C is an illustration of a tip interface displaying a general tip in accordance with one embodiment.

The tip period classification process 509 may be configured to classify a tip based on the number of tip periods, the distribution of tip periods, or the number of intervals within each tip period. In some embodiments, the tips are classified into three categories: an individual interval tip, a periodic tip, and a general tip. A tip is classified as an individual interval tip 511 when only a single time interval in the identified evaluation range is labeled for the tip or multiple tip periods comprising only one time interval are labeled for the tip. A tip is classified as a periodic tip 513 if a plurality of tip periods longer than one time interval are labeled for the tip. A tip is classified as a general tip 515 if the number of time intervals in the evaluation range labeled with a tip is greater than a threshold number, i.e., more than M days in a period are labeled with tip, for example where 3<=M<=7. Alternatively a tip may be classified as a general tip if the tip does not apply to a single time interval (e.g. a tip for the host to improve their response rate would increase the chance of a reservation for all time intervals). Figures FIGS. 11A, 11B, and 11C illustrate the tip interface presenting an individual interval tip 511, a periodic tip 513, and a general tip 515 respectively.

VI. Examples of Tip Types and Corresponding Tip Logic

FIGS. 6-9 provide examples of tip types and corresponding tip logic provided by the tip module 207 in accordance with some embodiments. Additionally, example tip types with simpler corresponding tip logic are presented herein but do not have corresponding figures.

Figure 6:
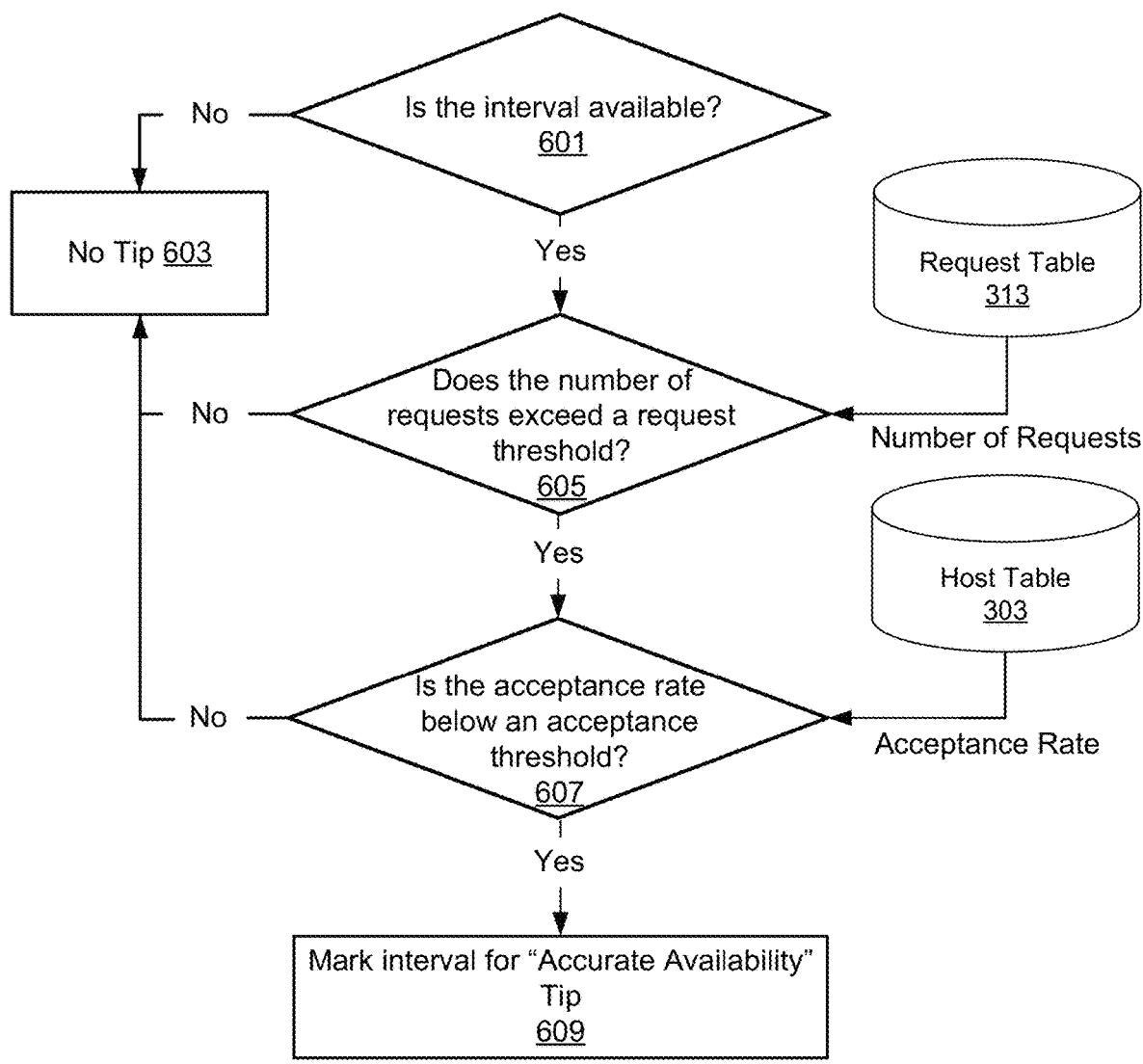
FIG. 6 is a flow diagram of decision logic for determining an accurate availability tip in accordance with one embodiment.

FIG. 6 is a flow diagram of decision logic for determining an accurate availability tip in accordance with one embodiment. The accurate availability tip is one example of a tip that utilizes host metrics 421 from the host table 303 and requests from the request table 313. The accurate availability tip specifically aims to determine whether the host should be presented with a tip to block a time interval, indicating that the time interval was incorrectly marked as available by host. This tip prevents continual rejection of reservation requests from potential guests, which lowers overall user satisfaction and makes it less likely the host of the subject listing will receive requests in the future.

The tip logic corresponding to an accurate availability tip type implemented by the tip module 207 begins by determining 601 whether a given time interval is available by retrieving data from the listing calendar 429. If the time interval is not available the listing is not marked 603 with the accurate availability tip. If the time interval is available then the tip module 207 then retrieves data from the request table 313 to determine 605 if the number of requests by potential guests to reserve the subject listing 405 for the time interval exceeds a predetermined request threshold. For example, a request threshold may be N requests, where N is determined based on the requested start time 441, the requested duration 443, and the acceptance status 447 of entries in the request table 313 for the subject listing 405. Upon that determination the tip module 207 determines 607 whether the acceptance rate of the host of the subject listing 405 is below an acceptance threshold by retrieving host metrics 421 for the host of the subject listing 405 from the host table 303 (i.e., the acceptance rate of the host is below a threshold value of 80%). Once this determination has been made the tip module 207 marks the time interval with an accurate availability tip. The accurate availability tip advises the host of the subject listing 405 to change the availability of the subject listing for the time interval labeled with the tip.

Figure 7:
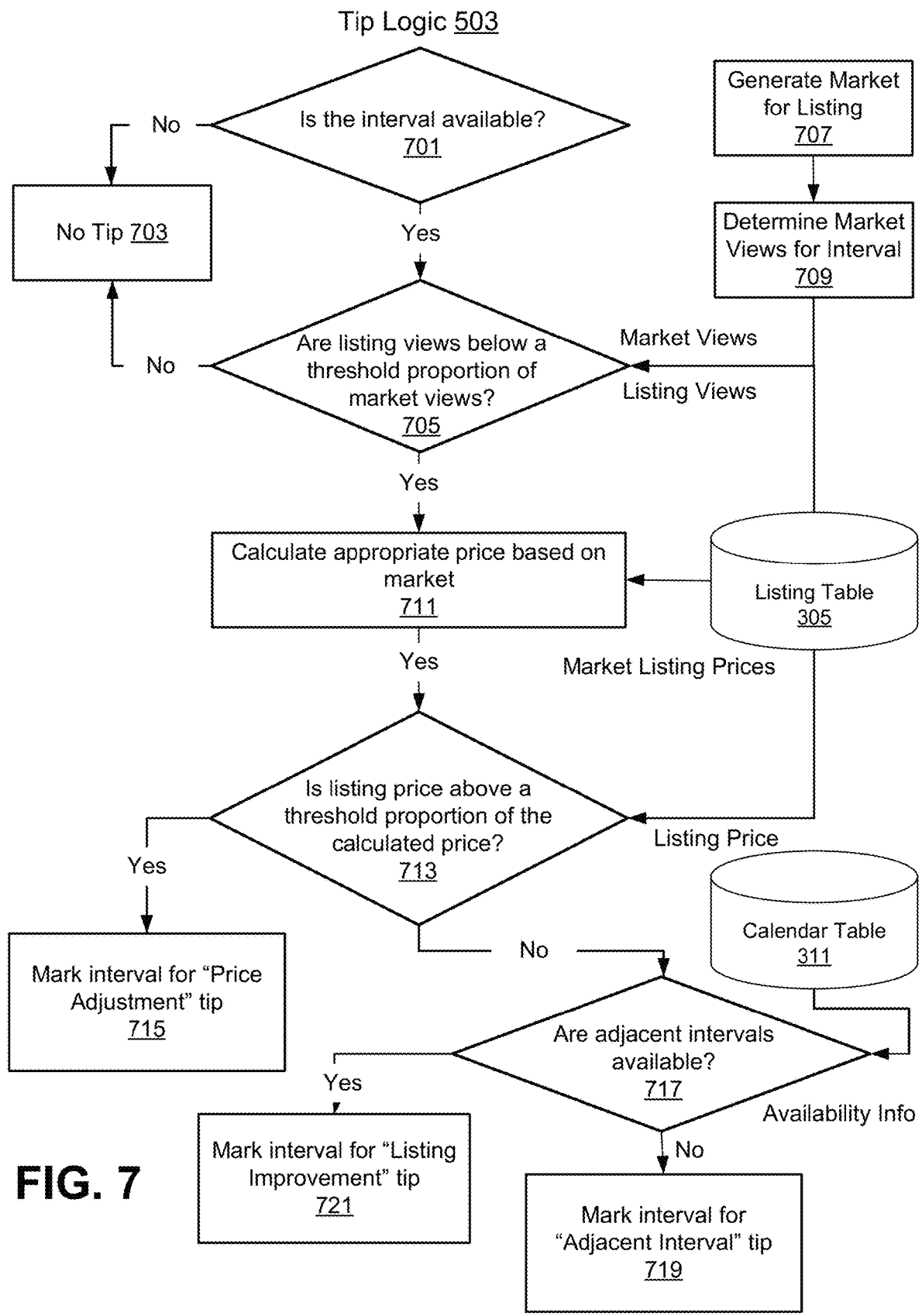
FIG. 7 is a flow diagram of decision logic for determining a price adjustment tip, a listing improvement tip, or an open adjacent dates tip in accordance with one embodiment.

FIG. 7 is a flow diagram of decision logic for determining a price adjustment tip, a listing improvement tip, or an open adjacent dates tip in accordance with one embodiment. All three tips are examples of tips utilizing viewing data for the subject listing 405 and viewing data for the peer group of the subject listing 405 along with listing attributes of the subject listing compared to the listings in the peer group of the subject listing 405. The three types of tips are related as they each offer a different solution for the same problem of below average number views of the subject listing when compared to peer group views. The price adjustment tip attributes the below average number of listing views to a poorly adjusted price 425 of the subject listing 405 for that time interval. The open adjacent dates tip attributes the below average number of listing views to the position of the time interval between booked or blocked time intervals. If the data do not support either of the previous two tips the listing improvement tip attributes the below average views to a problem with other listing attributes including the instant-book status 433, the listing images 435, or the listing description 437.

The tip module 207 implements tip logic for the price adjustment tip and other tips by determining 701 the availability of the time interval to be labeled, by checking the availability of the time interval in the calendar 429. If the time interval is not available the interval is not labeled 703 with any tip. If the time interval is available, then the tip module 207 determines 705 whether the number of views of the subject listing for the time interval is below a threshold proportion of peer group views for the same interval. Determining 705 whether the subject listing views are below a threshold proportion of average peer group views includes the steps of generating a peer group for the subject listing 707 and determining peer group views for the time interval 709.

After the number of peer group views has been determined 709, the tip module 207 calculates the average number of peer group views per listing by dividing the total peer group views by the number of listings 405 in the peer group. The tip module 207 then calculates the ratio of the subject listing views to the average number of peer group listing views. If the calculated proportion is below a threshold value (e.g. subject listing's views are less than 75% of peer group views), the tip module 207 calculates 711 a price tip for the subject listing. If the subject listing views are greater than or equal to the threshold (e.g. greater than or equal to 75% given a threshold value of 75%) then no tips are given 703.

In order to make a tip for the price 425 of the subject listing, the tip system uses a trained pricing model that simulates the effects of pricing the subject listing 405 at a number of different price levels. The model predicts demand based on historical demand for a listings peer group of listings and specific attributes of a listing including its price. Specifically, the model predicts the probability that a particular interval, in this case the interval being evaluated for a price tip ($t_{eval}$) 1 will be reserved at price level (p) for every time interval starting from a current time (t) until the time interval of interest (again, $t_{eval}$). This can be also be stated as a probability function:

$$P(t_r < t_{eval} | t, \text{attributes}(t), p_{eval})$$

For clarification, the model predicts the probability that $t_r$ (the time that the host of the subject listing receives a reservation request to reserve the subject listing 405 for time interval $t_{eval}$) will be before $t_{eval}$, given the current time t, the listing attributes of the subject listing 405 at time t and the attributes of the peer group at time t, and the price $p_{eval}$ for the time interval $t_{eval}$.

The probability function is evaluated at a number of different price levels. These probabilities are then fit to a monotonic decreasing function, $P_{request} = F(p_{eval})$ to infer the probability of receiving a reservation request given a particular price 425 for the subject listing 405. The function is a monotonic decreasing function because it is generally assumed that likelihood of receiving a reservation request from a potential guest falls off as price 425 increases, which has generally been shown to be true in practice. This fit curve can be used to provide one or more price tips to the host (e.g., the tested prices, or prices anywhere along the fit function), along with attendant likelihoods of receiving a reservation request based on the fit function. Thus, the host may be provided not only with price information, but also information regarding the likelihood/risk of the listing receiving a reservation request (and thus being reserved and returning revenue to the host) for a given time interval depending on the tip type.

In one embodiment, the predicted price or likelihood of a reservation request can be further improved. For example, the price that provides the maximum host revenue can be determined by calculating the maximum value of the probability P multiplied by the price $p_{eval}$ corresponding to each probability value P, for each price 425, $p_{eval}$, between a minimum and a maximum price ($p_{min}$ and $p_{max}$) where the minimum price is typically $0 and the maximum price is the price at which the value of the P function is substantially 0:

revenue$_{max}$=max{$p_{eval}$×P($t_r$<$t_{eval}$|t,attributes(t),$p_{eval}$)
}:$p_{eval}$=[$p_{min}$,$p_{max}$]

The probability can also be used to provide a single price tip to the host given a range of possible reservation times (rather than day-by-day price tips). This is especially useful when a price adjustment tip is applicable to multiple consecutive time intervals. This can be achieved by informing the host of a price that satisfies a cumulative sum of probability functions for the individual time intervals over the series of time intervals being evaluated.

In each of these functions, the current time t is included in the probability to reflect that the prediction will change over time as the pricing model is updated to include additional information. More details regarding the price optimization function can be found in provisional application No. 62/112,567, which is hereby incorporated by reference in its entirety.

Figure 12:
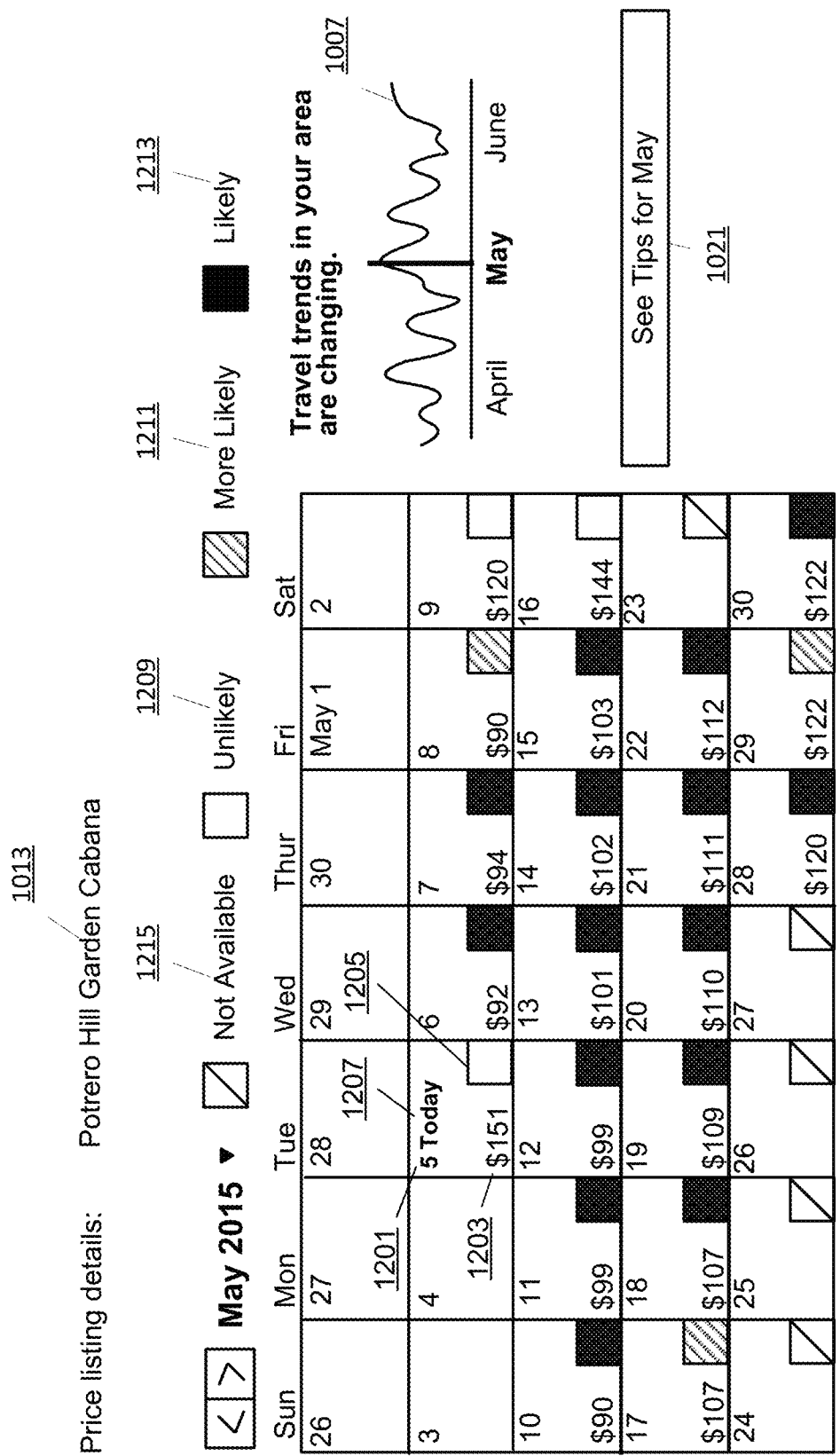
FIG. 12 is an illustration of an alternate tip interface displaying an indication of the likelihood of receiving a reservation request in accordance with one embodiment.

In some embodiments, an indication of the output P of the probability function is displayed directly to the user instead of being used to determine a price that increases the likelihood of receiving a reservation request from a potential guest. The probability of receiving a reservation request may be displayed in association with each available time interval and may be indicated through any suitable means. An alternate tip interface that may be used to display the results of the probability function is illustrated in FIG. 12 and explained in an accompanying description.

After determining an appropriate listing price, the tip module 207 determines 713 if the listing price 425 is above a threshold proportion of the appropriate listing price (e.g. if the listing price 425 is greater than 1.5 times the appropriate listing price). Upon a determination 713 that the listing price 425 exceeds the threshold proportion the appropriate listing price, the tip module 207 marks the interval with a price adjustment tip 715.

The price adjustment tip 715 may include a message to the host of the subject listing 405 that the price 425 of the subject listing exceeds the optimal listing price range for the peer group of the subject listing and additionally may inform the host of a price 425 for a reservation of the subject listing at the marked intervals. In some embodiments, an icon may accompany a price adjustment tip message and, upon the host's selection of the icon, the tip module 207 is invoked, which, at the direction of the host, automatically changes the price of the subject listing to the calculated price for the marked time intervals, by updating the listing 405 in the listing table 305 to include the calculated price 425.

If the price 425 of the subject listing 405 does not exceed the threshold proportion of the calculated price, the tip module 207 may reference the listing calendar 429 to determine 717 if the intervals temporally proximate to the time interval being evaluated are available. If the temporally proximate intervals are blocked by the host (as opposed to being reserved by other guests or available for reservation) the tip module 207 may mark the time interval with an adjacent interval tip 719. The adjacent interval tip implies that guests are looking for longer reservation durations and so are not viewing the subject listing since only a few time intervals are available for reservation. For example, in an accommodation reservation system guests as a whole may be more likely to search for a three night stay from May 1 through May 4, however the subject listing may only be available on the May 2 and May 4 while May 1 and May 3 are blocked. Therefore, the reservation system 113 may inform the host that making May 1 and May 3 available may increase the number of views and therefore the likelihood of a request to reserve the subject listing on May 2.

The adjacent interval tip 719 may include a message to the host of the subject listing 405 informing the host that opening the blocked proximate intervals may increase the likelihood of the host receiving a reservation request. In some embodiments, an icon may accompany an adjacent interval tip message and, upon the host's selection of the icon, the tip module 207 is invoked and automatically sets the blocked proximate intervals of the subject listing 405 to available on listing calendar 429.

In the cases that the tip module determines 717 that the proximate time intervals are not blocked by the host of the subject listing 405, the time interval may be marked for a listing improvement tip 721. The listing improvement may include a message informing the host of general improvements to the listing 405 that will be visible to potential guests when browsing a series of listing previews in a set of search results, thus making the subject listing 405 more likely to be viewed by potential guests. General tips for improvement of a subject listing 405 may include updating the listing images 435, especially the preview image, improving the listing description 437 or title, or enabling instant-book 433 to allow for easy reservation of the subject listing 405.

Figure 8:
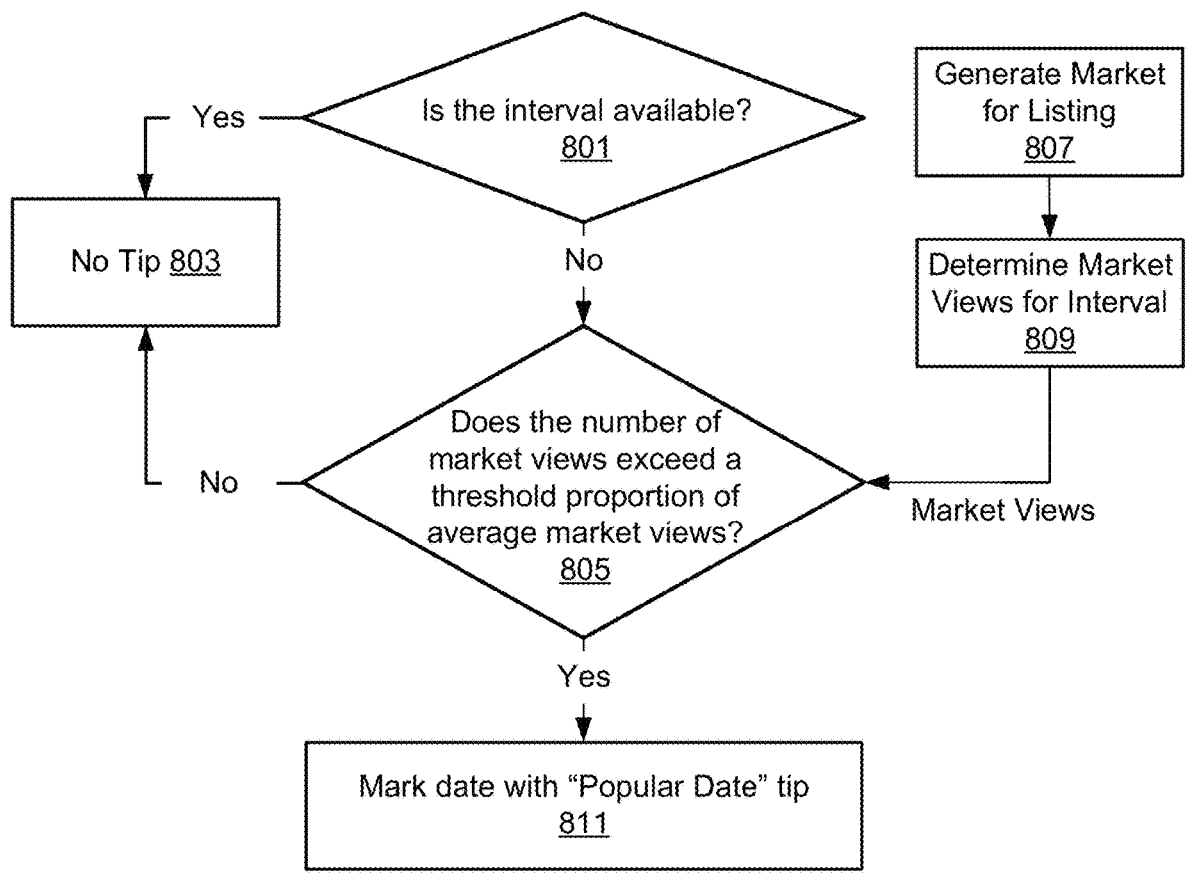
FIG. 8 is a flow diagram of decision logic for determining a popular date tip in accordance with one embodiment.

FIG. 8 is a flow diagram of conditional expressions for determining a popular date tip in accordance with one embodiment. A popular date tip is one example of a tip that uses peer group viewing data and availability date of the subject listing 405. The popular date tip is used to notify the host of the subject listing 405 that there would be a high likelihood of receiving a reservation request on a particular interval that is currently indicated by the host as not available, based on a large number of peer group views for the same interval, if the host made the interval available for reservation on the listing calendar 429.

The tip module 207 implements tip logic to determine if a particular time interval should be marked with a popular date tip by first determining 801 whether the interval is available. If the interval is available, the interval is not marked 803 with a popular date tip. If the interval is not available, the tip module 207 determines 805 whether the number of peer group views received for the particular time interval is greater than a threshold proportion of the average number of peer group views for any given time interval (e.g. if the average number of peer group views for the time interval being evaluated at least 50% greater than the average number of peer group views for an average time interval). Generating 805 a peer group for the subject listing 405 and determining the average number of peer group views for the time interval and for the peer group over all time intervals 809 is accomplished using the same above described process with reference to FIG. 7.

If the average number of listing views in the peer group for the time interval being evaluated exceeds the average number of listing views over a predetermined range of time intervals, the tip module marks the time interval with a popular date tip 811. The popular date tip 811 may include a message informing the guest that making the time interval available for reservation by a potential guest will increase the likelihood of the host receiving a reservation request for the subject listing 405. In some embodiments, an icon may accompany a popular date tip message and, upon the host's selection of the icon, the tip module 207 is invoked and automatically changes the time interval being evaluated to being available for reservation by potential guests on the listing calendar 429.

Figure 9:
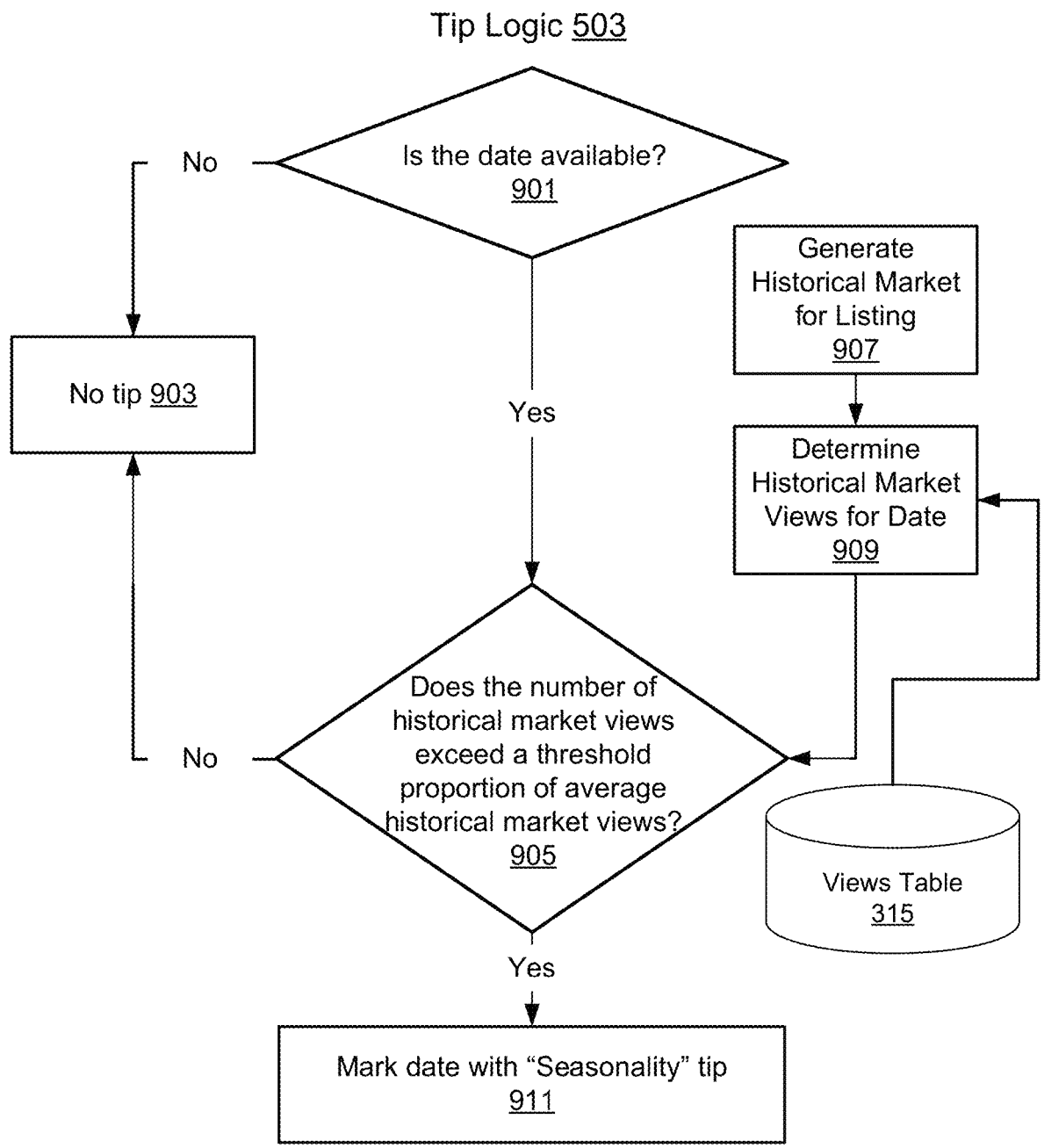
FIG. 9 is a flow diagram of decision logic for determining a seasonality tip in accordance with one embodiment.

FIG. 9 is a flow diagram of conditional expressions and calculations for determining a seasonality tip in accordance with one embodiment. A seasonality tip is one example or a tip that uses historical peer group data and listing availability data from the listing calendar. The seasonality tip logic is similar to the popular date tip logic except step 805 is replaced with step 905, which compares the time interval being evaluated to a corresponding historical time interval (e.g. May 4 this year compared to May 4 the year before). To accomplish this, the tip module 207 determines a historical peer group for the subject listing. The historical peer group may include only listings 405 that are still listed on the reservation system 113 or it may include listings 405 that were listed historically but are no longer listed. The tip module 207 then retrieves viewing data for the historical listings from the view table 315. If, based on the historical viewing data for the peer group listings 405, the time interval being evaluated is a popular interval, the tip module 207 marks the time interval with a seasonality tip 911. In some embodiments, the reservation system 113 may designate particular time intervals (e.g. in an accommodation reservation system days around winter holidays may be considered seasonal days in some locations without having to generate a peer group and retrieve peer group listing views)

The seasonality tip may include a message indicating to the host that they should make the subject listing available for a particular time interval because the particular time interval has proven to be popular historically. In some embodiments, an icon may accompany a seasonality tip message and, upon the host's selection of the icon, the tip module 207 in invoked, and automatically changes the time interval being evaluated to being available for reservation by potential guests on the listing calendar 429.

Tip types of the reservation system 113 are not limited to the tip types described above. For example query data for listings 405 in the peer group of the subject listing 405 may be used. Because each query by potential guests may be saved in the query table 317 upon selection to view a listing 405 the tip module has access to frequently searched attributes and provide corresponding tips. For example, if a threshold proportion of potential guests searching over a peer group of the subject listing in an accommodation reservation system are searching for listings offering WiFi, the tip module 207 may inform a host that offering reliable WiFi will increase the likelihood of the host receiving a reservation request for the subject listing 405.

VII. Tip Interface

Figure 10:
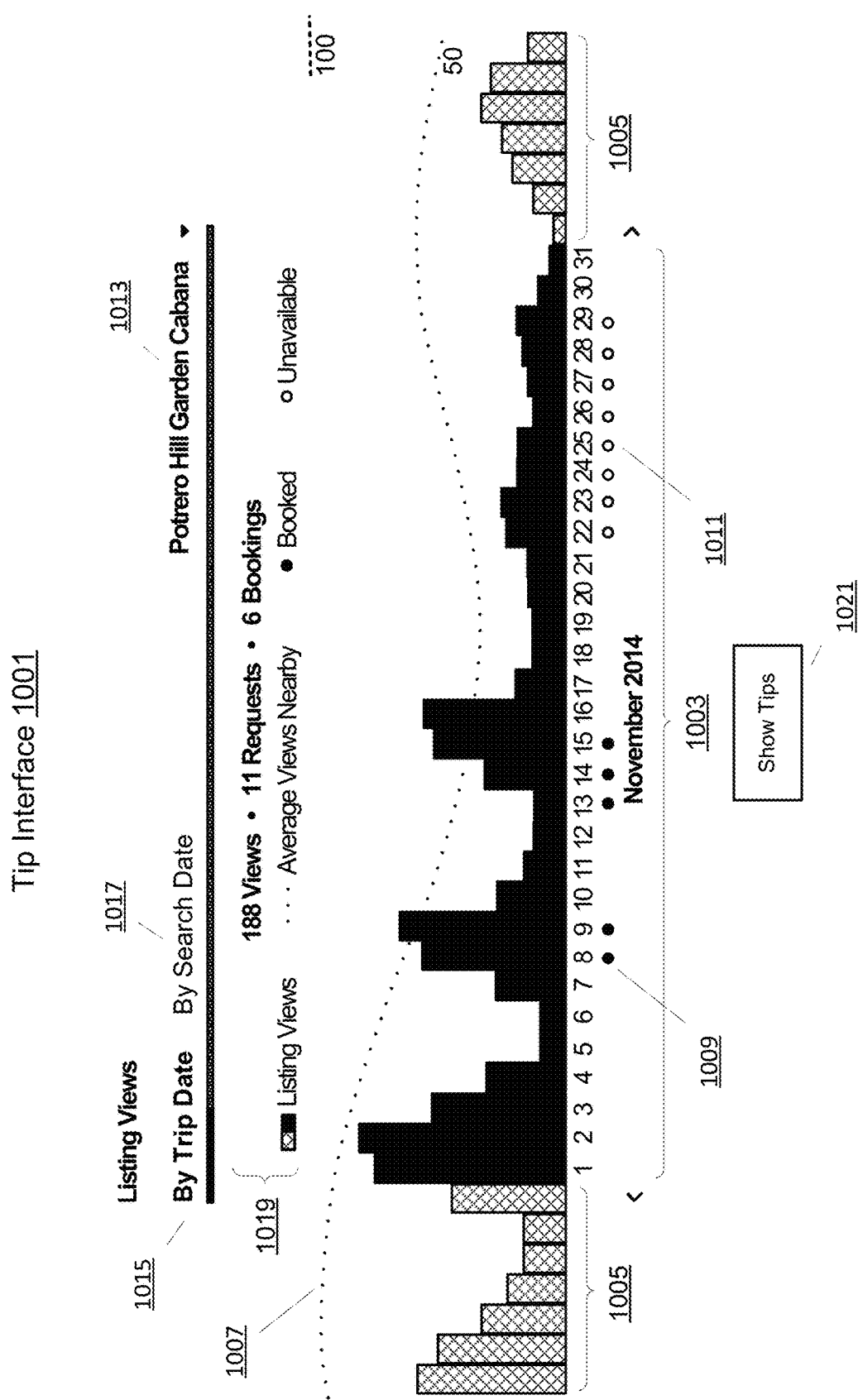
FIG. 10 is an illustration of a tip interface for displaying tips to a host in accordance with one embodiment.

FIG. 10 is an illustration of a tip interface for displaying tips to a host in accordance with one embodiment. An exemplary tip interface 1001 is a GUI that provides a means of visualizing the viewing data of the subject listing as compared to peer group viewing data in addition to a region for displaying tips. The graphic means for comparing viewing data between the peer group and the subject listing may be highlighted according to the tip displayed in the tip region.

In one embodiment, the tip interface comprises a histogram having a plurality of graphic representations of time intervals, where each time interval of the histogram corresponds to a time interval that may be evaluated for a tip and may be individually reserved by a potential guest. The tip interface 1001 may be accessible to the host of the subject listing 405 via the reservation system application 105 installed on the client device 103. The tip module may optionally run in the background of the application 105 and automatically display the tip GUI when a threshold number of tips are applicable to the tip.

The example tip interface 1001 illustrated in FIG. 10 includes a number of exemplary GUI features designed to facilitate the delivery of tips to the host of the subject listing 405 in an accommodation reservation system. For example, the time intervals correspond to dates in a month 1003 that a potential guest may reserve the accommodation represented by the subject listing 405. A similar tip interface layout could also be used for other types of reservation systems. The reservation interface 1001 includes highlighted dates 1003, non-highlighted dates 1005, a peer group views curve 1007, reservation indicators 1009, blocked date indicators 1009, a subject listing title 1013, a trip date views 1015, a search date button 1017, a tip interface legend 1019, and a show tips icon 1021. The subject listing title 1013 indicates the subject listing 405 for which the tip interface 1001 is displaying viewing data and tips.

The highlighted dates 1003 indicate the range of dates for which tips may be displayed, which corresponds to the evaluation date range described above. Each date in the range has a corresponding column in the histogram. The height (magnitude) of each column is representative of the number of listing views for the subject listing 405 for a reservation on the corresponding date. When tips are displayed in the tip interface 1001, the highlighted dates may change to only include the tip periods of the current displayed tip. The non-highlighted dates 1005 are any dates that are not currently in the evaluation time range or are not included in the tip period of a currently displayed tip.

The peer group views curve 1007 indicates peer group views for comparison to the histogram of views for the subject listing 405. The peer group views indicator 1007 may be a line as illustrated in FIG. 10 or it may be any other representation in the scale of the histogram displaying the subject listing views. The height of the curve 1007 at each time interval is representative the number of views of peer group listings during that time interval. For example, in FIG. 10 it can be seen that the subject listing views for November 1-8 are less than the peer group views, but the number of subject listing views for November 9 exceeds the peer group views.

Reservation indicators 1009 indicate that the subject listing has been reserved by a guest for the date corresponding to the histogram column directly, thereby indicating a successful reservation on the reservation system 113. Blocked date indicators 1011 indicate that the host of the subject listing has blocked the associated date on the listing calendar 429, thereby making the subject listing unavailable to guests. These indicators allow the host to determine the dates of interest to the host and may exclude these dates from being eligible for tip marking. Additional indicators of the same style as the reservation indicators 1009 and blocked date indicators 1011 may also be displayed. For example, a request received indicator could also be shown indicating that the host could complete a reservation if they accept the reservation request. If the application 105 receives an interaction on a request received indicator in the tip interface 1001 it may allow the host to accept the reservation request without leaving the tip interface 1001.

The trip date button 1015 and the search date button 1017 allow the host to toggle between views in the tip interface 1001. The trip date button 1015 organizes views by trip date (i.e. the desired reservation times of the potential guest) and enables all of the tip features described herein. The search date button organizes the views by the date that the view occurred instead of the desired reservation time of the potential guest. Search date organization may provide additional information to the host but is not used in the tip providing process.

The tip interface legend 1019 is a legend for the histogram that indicates the meaning of the highlighted 1003 and non-highlighted 1005 dates along with the peer group views indicator 1007. The reservation indicator 1009 and the blocked date indicator 1011 are also labeled such that the host can understand the histogram or any other graphic displaying views of the subject listing.

The show tips icon 1021 is an icon that, upon receiving an interaction from the host of the subject listing 405, may display a series of eligible tips for the highlighted dates 1005. Alternatively, the tips may be automatically displayed in a region corresponding to the location of the show tips icon 1021. The show tips icon may optionally read "display tips," "show tips," or any other synonym or substantially similar phrase or graphic icon. FIGS. 11A, 11B, and 11C illustrate how tips may be displayed in response to receiving an interaction from the host on the show tips icon 1021.

As described above, in some embodiments, the tip interface 1001 can display three categories of tips daily tips, periodic tips, and general tips. These tip categories may be displayed in any order in response to the application 105 receiving an input on the show tips icon. In addition, each type of tip may be accompanied by a message in the tip region. Upon display of a first tip in the tip region, in some embodiments, the host has the option to view additional tips by selecting a show next button. In this way the tip interface is able to present a series of tips for quick implementation by the host.

FIG. 11A is an illustration of a tip interface displaying a daily tip in accordance with one embodiment. A daily tip occurs when only individual time intervals are determined eligible for a particular tip type. The tip interface 1001 displays a number of additional features when displaying a daily tip including a tip region 1101, a tip name 1103, a tip explanation 1105, an implement tip icon 1107, a next tip icon 1109, and a hover-over window 1111.

A tip region 1101 is a dedicated region of the tip interface 1001 that displays tip details to the host. The tip region may change location or format depending on the tip type. For example, the tip may be a pop-up window that changes locations depending on where on the histogram the tip periods are located.

A tip name 1103 is a location for the name of the tip type that is being presented to the host.

The tip explanation 1105 is text that explains the tip to the host generally in understandable layman's terms. The message displayed as the tip explanation 1105 may be particular to the tip type and may also include details that are specific the individual tip, for example, dates or time intervals affected within the tip period, a price calculated by the tip module 207, etc. The tip explanation may also contain images, videos, or other media to inform the host of how they can make beneficial changes to the subject listing.

An implement tip icon 1107 is an icon where upon receiving an interaction from the host the tip is automatically implemented in the subject listing 405 by invocation of the tip module 207. For example, if the tip being displayed is a price tip, receiving a selection of the implement tip icon 1107 will cause the tip module 207 to change the listing price 425 to the calculated listing price of the price tip. After implementing the tip, the tip interface 1001 may either display the next tip or it may return the default interface illustrated in FIG. 10. A next tip icon 1109 skips the current tip without implementing the tip. Upon skipping the tip the next tip is displayed in the tip region 1101 unless there are no longer any tips to display in which case the tip interface returns to its appearance as illustrated in FIG. 10. If a tip is skipped and not implemented the tip remains viewable at the press of the show tips icon 1021.

A hover-over window 1111 is an informational window that, in some embodiments, is displayed in response to the application 105 receiving an interaction from the host over a particular date or time interval on the histogram of the tip interface 1001. The hover-over window 1111 may display information such as the number of views for the particular date, the number of requests, and the number of reservations or bookings. Additionally, if the time interval or date is eligible for a tip, the tip name 1103 and a short detail regarding the tip may be displayed. In some embodiments, the hover-over window 1111 will be displayed in conjunction with the tip description and name in the tip region 1101 if the tip being displayed only applies to one date or time interval (a daily tip).

The tip module 207 may display a daily tip in the same way it displays a periodic tip, which is discussed with regard to FIG. 11B. FIG. 11B is an illustration of a tip interface displaying a periodic tip in accordance with one embodiment. In this illustration, the tip region 1101 is identical to the tip region illustrated in FIG. 11A. However, when displaying a periodic tip, the highlighted dates 1103 change from corresponding to the evaluation time range as a whole (e.g. the entire month of November) to corresponding with the tip periods of the tip displayed in the tip region 1101. In some embodiments, the highlighted tip periods on the histogram can also be applied to daily tips (i.e. only one interval is highlighted). In addition to highlighting the intervals on the histogram corresponding to the tip periods of the displayed tip, the tip interface may also highlight areas of the peer group views indicator 1007 to emphasize discrepancies between the two values.

FIG. 11C is an illustration of a tip interface displaying a general tip in accordance with one embodiment. The general tip is a tip that affects all days in the tip period. Therefore the highlighted dates 1003 include the entire evaluation range.

FIG. 12 is an illustration of an alternate tip interface displaying an indication of the likelihood of receiving a reservation request in accordance with one embodiment. The alternate tip interface may have similar features to the tip interface displayed in FIG. 10 including a peer group views indicator 1007, a subject listing title 1013, a show tips icon 1021, or any other suitable UI items from FIGS. 10-11C. The alternate tip interface displays a calendar for a particular listing 405. Each date on the calendar may display a calendar date 1201, a price indication 1203, and a request likelihood indication 1205. The calendar may also include a current date indication 1207, indicating the current date on the calendar. The price indication 1203 may be a numerical representation of the price of the listing on the date of the associated calendar date 1201. In some embodiments, the price indication 1203 may be a graphical indication of the price. The request likelihood indication 1205 indicates the likelihood that the subject listing 405 will receive a reservation request on the associated date given the price 425. The request likelihood indication 1205 may be a change of the color of the price indication 1203 where each color corresponds to the likelihood of receiving a reservation request. In some embodiments, the likelihood indication 1205 may be represented discretely by a range of symbols indicating various levels of the likelihood of receiving a reservation request. In the exemplary illustration of FIG. 12 the white square 1209 indicates that receiving a reservation request is unlikely, the striped square 1211 indicates that receiving a reservation request is more likely, and a black square 1213 indicates that receiving a reservation request is likely. The symbols or colors serving the function of the request likelihood indication 1205 may correspond to any range of likelihood values as configured in the reservation system 113. Additionally the calendar may display the availability of the listing 405 on a particular date using a symbol or other indication indicating that the listing is unavailable. For example, the square with the slash through it 1215 indicates that the date is unavailable.

Figure 13:
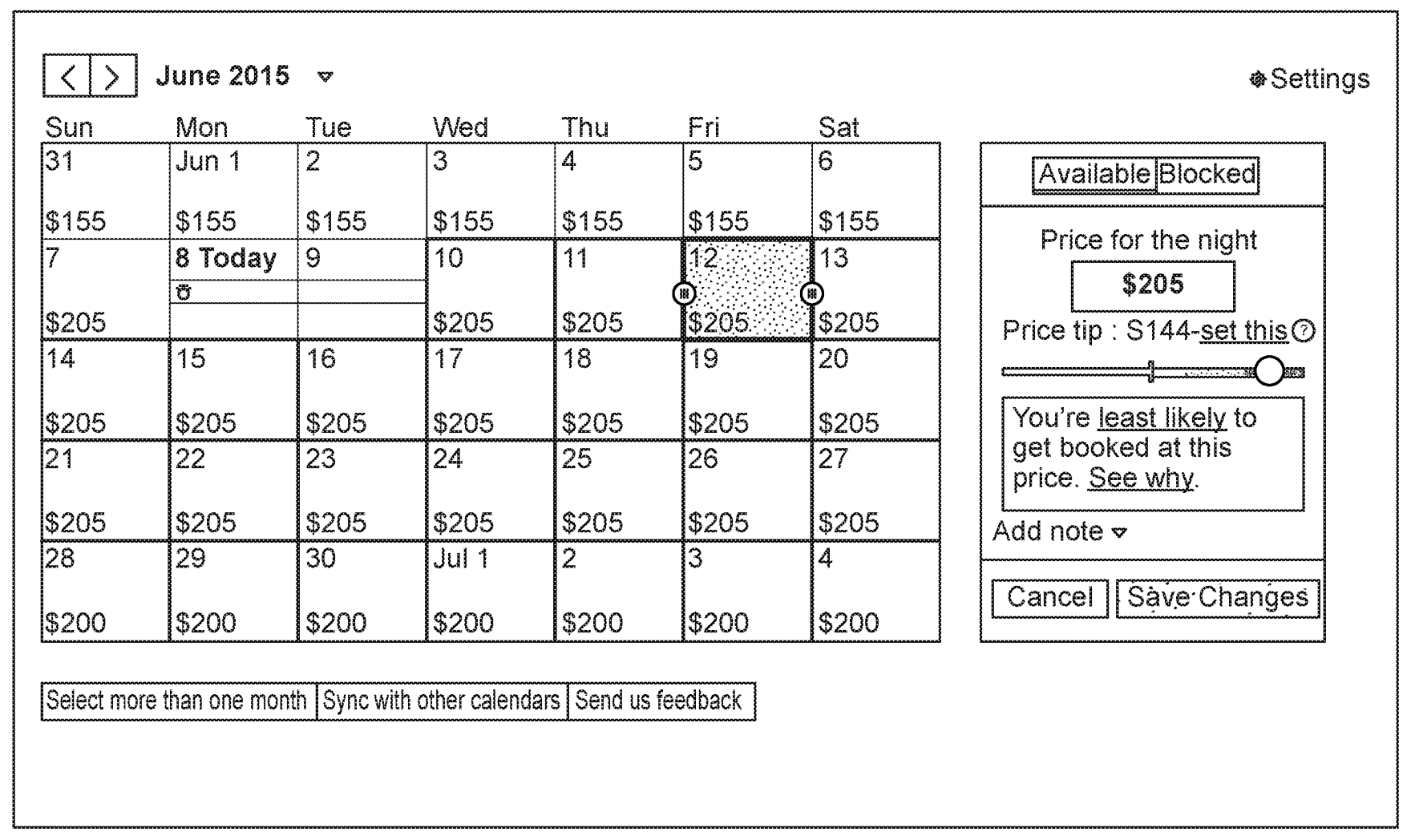

FIG. 13 is an illustration of an additional tip interface displaying an indication of a relative likelihood of receiving a reservation request in accordance with one embodiment. In some embodiments, the tip interface may display the relative likelihood of receiving a reservation request for a particular date. The tip interface may display any graphic comparing the likelihood of receiving a reservation request for the particular date at the current price to a range of possible likelihoods corresponding to different prices. In some embodiments, the likelihood graphic is a sliding scale that modifies the price corresponding to the position of the slider. One side of the slider indicates a low likelihood of receiving a reservation request while the other side indicates a high likelihood of receiving a reservation request. In some embodiments, the slider may indicate a threshold likelihood that is preferable to improve the reservation rate or the revenue for the listing. By displaying the full range of prices for the listing corresponding to the range of likelihoods gives the host the ability to better decide on a price for their listing.

Figure 14:
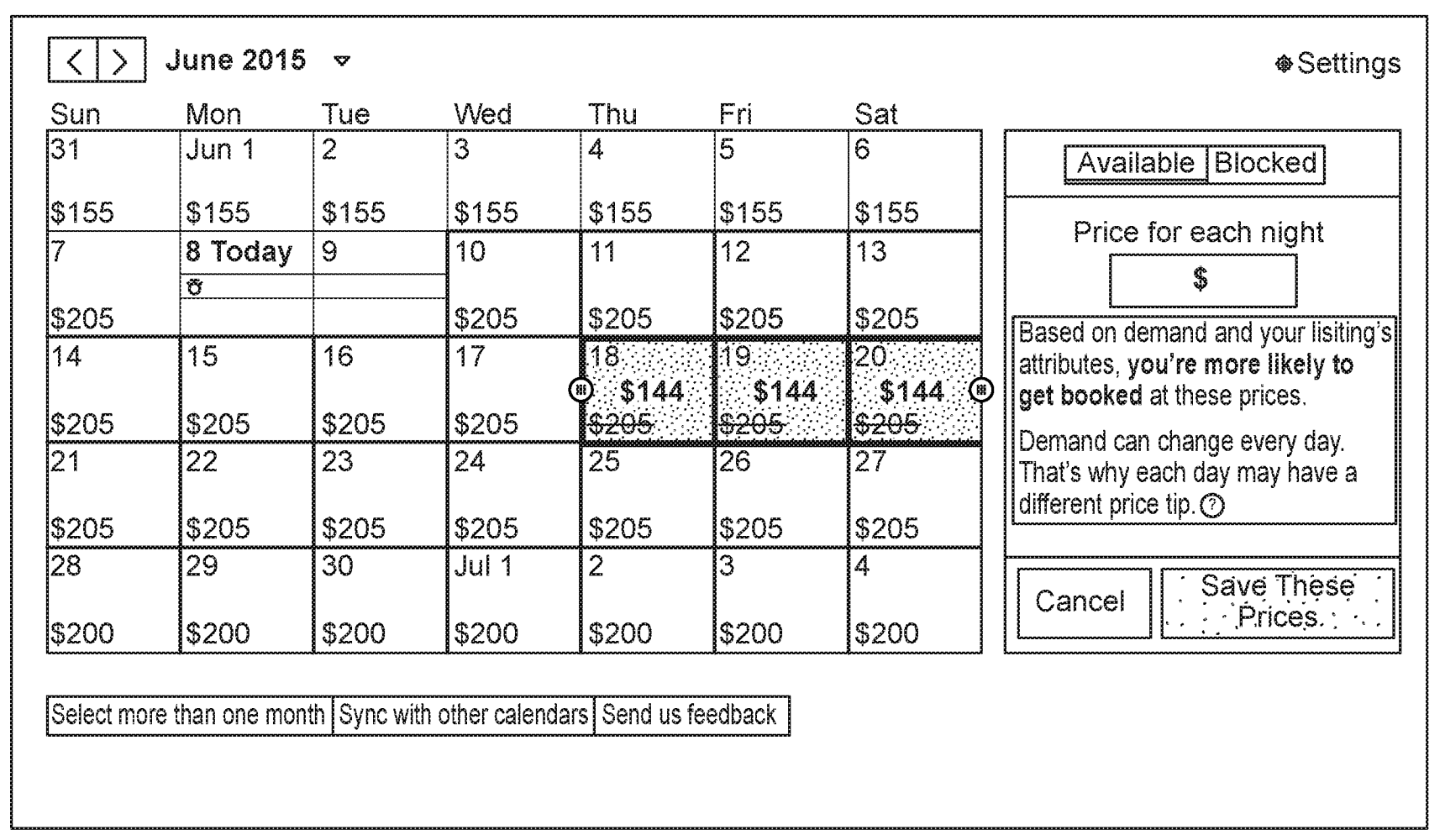

FIG. 14 is an illustration of an additional tip interface displaying price tips on multiple days in accordance with one embodiment.

Figure 15:
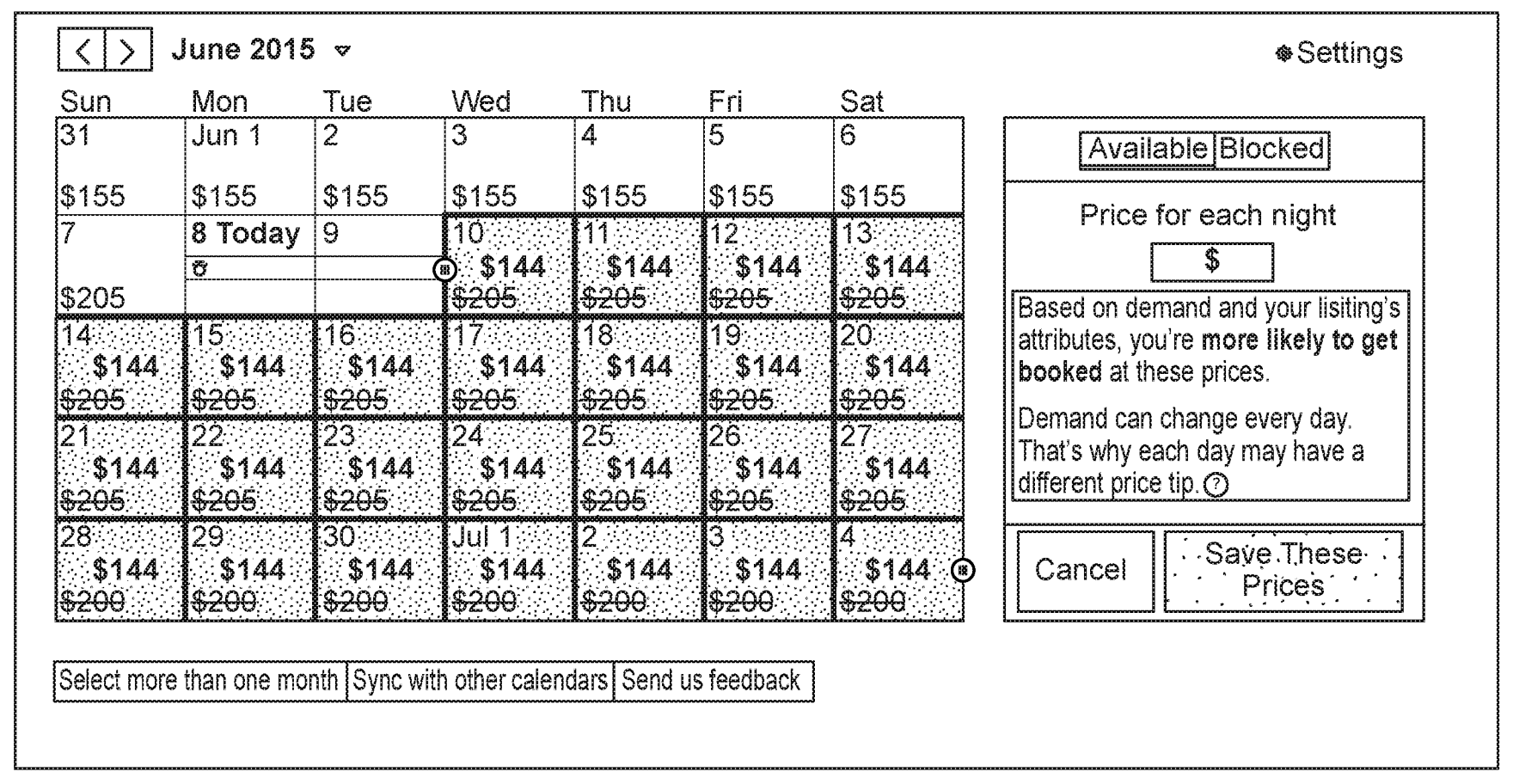

FIG. 15 is an illustration of an additional tip interface displaying price tips for a whole month in accordance with one embodiment.

VIII. Additional Considerations

FIG. 1 and the other figures use like reference numerals to identify like elements. A letter after a reference numeral, such as "113A," indicates that the text refers specifically to the element having that particular reference numeral. A reference numeral in the text without a following letter, such as "113," refers to any or all of the elements in the figures bearing that reference numeral (e.g. "113" in the text refers to reference numerals "113A" and/or "113B" in the figures).

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof. In one embodiment, a software module is implemented with a computer program product comprising a persistent computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a computing device selectively activated or reconfigured by a computer program stored in the computer. Such a computer program may be stored in a persistent non-transitory computer readable storage medium, and coupled to a computer system bus. Furthermore, any computing systems referred to in the specification may include a single processor or may be architectures employing multiple processor designs for increased computing capability.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, an example of which is set forth in the following claims.

What is claimed is:

1. A computer-executed method performed automatically by an online reservation system comprising:
   maintaining, in a database, a plurality of searchable listings of a plurality of hosts in the online reservation system, each listing associated with one of the plurality of hosts and having an availability calendar and a plurality of listing attributes;
   receiving, over a network, a plurality of viewing requests from a plurality of client devices;
   storing, in the database, the plurality of received viewing requests, each viewing request including viewing data comprising a viewing time, a desired reservation period, and a viewed listing of the plurality of searchable listings;
   querying the database for a set of viewing data for a subject listing of the plurality of searchable listings associated with an evaluation time period comprising a series of time intervals, the subject listing having a subject availability calendar and a plurality of subject listing attributes;
   identifying, based on the subject listing attributes, a plurality of similar listings, each listing of the plurality of similar listings comprising listing attributes similar to the subject listing attributes;
   querying the database for a set of viewing data for the plurality of similar listings associated with the evaluation time period;
   automatically generating a graphical user interface comprising:
      a graphical representation of the set of viewing data for the subject listing and the set of viewing data for the plurality of similar listings over the evaluation time period;
      for each time interval in the evaluation time period, an indication of the likelihood of receiving a reservation request for the subject listing for the time interval based on the set of viewing data for the plurality of similar listings and the subject listing attributes, the indication proximate the graphical representation of the viewing data of the subject listing; and a tip region for displaying tips regarding the subject listing;

determining, using a set of conditional expressions, a listing tip associated with one or more tip periods in the evaluation time period based on the set of viewing data for the subject listing, the set of viewing data for the plurality of similar listings, and the subject availability calendar; and responsive to receiving a request to view the listing tip, displaying a description of the listing tip in the tip region.

2. The method of claim 1, wherein the listing attributes include one of:

a listing location, a listing price, and a listing type.

3. The method of claim 1, wherein generating the graphical representation of the set of viewing data for the subject listing and the set of viewing data for the plurality of similar listings over the evaluation time period comprises:

querying the database, from the set of viewing data for the subject listing, for a number of views of the subject listing for each time interval based on whether each time interval is within desired reservation periods in the set of viewing data for the subject listing;

querying the database, from the set of viewing data for the plurality of similar listings, for a number of views of each listing of the plurality of similar listings for each time interval based on whether each time interval is within desired reservation periods in the set of viewing data for each listing of the plurality of similar listings;

calculating, from the determined number of views of each listing of the plurality of similar listings, an average number of views for the plurality of similar listings for each time interval; and generating a graphical representation for the evaluation time period representing the number of views for the subject listing and the average number of views for the plurality of similar listings for each time interval of the evaluation time period.

4. The method of claim 3, wherein the graphical representation of the set of viewing data for the subject listing and the set of viewing data for the plurality of similar listings is a histogram.

5. The method of claim 3, wherein determining, using a set of conditional expressions, a listing tip further comprises:

applying the set of conditional expressions to each time interval to determine eligibility for the listing tip of each time interval; and grouping consecutive time intervals determined as eligible into tip periods.

6. The method of claim 5, wherein applying a set of conditional expressions to determine eligibility for the listing tip of each time interval further comprises:

receiving a number of reservation requests for the listing at the time interval;

determining that the time interval is available;

determining that the number of reservation requests exceeds a request threshold;

determining that an acceptance rate for the listing at the time interval is below an acceptance rate threshold; and determining that the time interval is eligible for the listing tip, wherein the listing tip informs the host of potential benefits of blocking the subject listing for the time interval.

7. The method of claim 5, wherein applying a set of conditional expressions to determine eligibility for the listing tip of each time interval further comprises:

calculating a view ratio of the number of views of the subject listing for the time interval to the number of views of the plurality of similar listings for the time interval;

determining that the view ratio is below a view ratio threshold;

determining a price tip based on prices of the plurality of similar listings;

calculating a price ratio of a price of the subject listing for the time interval and the price tip;

determining that the price ratio exceeds a price ratio threshold; and determining that the time interval is eligible for the listing tip, wherein the listing tip informs the host of potential benefits of a decrease in the price of the subject listing for the time interval.

8. The method of claim 5, wherein applying a set of conditional expressions to determine eligibility for the listing tip of each time interval further comprises:

calculating a view ratio of the number of views of the subject listing for the time interval to the number of views of the plurality of similar listings for the time interval;

determining that the view ratio is below a view ratio threshold;

determining a price tip based on prices of the plurality of similar listings;

calculating a price ratio of a price of the subject listing for the time interval and the price tip;

determining that the price ratio does not exceed a price ratio threshold;

determining that adjacent time intervals are available; and determining that the time interval is eligible for the listing tip, wherein the listing tip informs the host of potential benefits of an improvement to attributes of the subject listing.

9. The method of claim 5, wherein applying a set of conditional expressions to determine eligibility for the listing tip of each time interval further comprises:

calculating a view ratio of the number of views of the subject listing for the time interval to the number of views of the plurality of similar listings for the time interval;

determining that the view ratio is below a view ratio threshold;

determining a price tip based on prices of the plurality of similar listings;

calculating a price ratio of a price of the subject listing for the time interval to the price tip;

determining that the price ratio does not exceed a price ratio threshold;

determining that adjacent time intervals are not available; and determining that the time interval is eligible for the listing tip, wherein the listing tip informs the host of potential benefits of making the adjacent time intervals to the time interval available.

10. The method of claim 5, wherein applying a set of conditional expressions to determine eligibility for the listing tip of each time interval further comprises:

determining that the time interval is not available;

determining that a number of views of the plurality of similar listings for the time interval exceeds an average number of views of the plurality of similar listings; and determining that the time interval is eligible for the listing tip, wherein the listing tip informs the host of potential benefits of making the subject listing available for the time interval.

11. The method of claim 5, wherein applying a set of conditional expressions to determine eligibility for the listing tip of each time interval further comprises:
   determining that the time interval is not available;
   predicting that a number of views of the plurality of similar listings for the time interval will exceed an average number of views of the plurality of similar listings based on historical viewing data of the plurality of similar listings; and
   determining that the time interval is eligible for the listing tip, wherein the listing tip informs the host of potential benefits of making the subject listing available for the time interval.

12. The method of claim 11, wherein predicting that a number of views of the plurality of similar listings for the time interval will exceed an average number of views of the plurality of similar listings further comprises selecting a plurality of additional historical listings to include in the plurality of similar listings, wherein a historical listing is not currently listed on the online reservation system.

13. The method of claim 1, further comprising:
   responsive to a request to view a graphical representation comparing viewing times of the viewing data of the subject listing to viewing times of the plurality of similar listings, displaying the graphical user interface to the host associated with the subject listing.

14. The method of claim 1, wherein, the indication of the availability of the subject listing indicates whether the listing is available, booked, or blocked.

15. The method of claim 1, wherein determining the listing tip further comprises determining the listing tip based on the listing attributes of the subject listing and listing attributes of the plurality of similar listings.

16. The method of claim 1, further comprises designating, based on the one or more tip periods, the listing tip as a general, periodic, or daily tip.

17. The method of claim 16, further comprising in response to receiving a request to view the listings tip displaying an indication of the designation of the listing tip as a general, periodic, or daily tip.

18. The method of claim 1, wherein the listing tip informs the host of potential benefits of modifying a price of the subject listing.

19. The method of claim 1 further comprising, responsive to receiving the request to view the listing tip, displaying an implementation icon within the graphical user interface, wherein receiving an interaction with the implementation icon causes the online reservation system to implement the listing tip automatically.

20. The method of claim 1, wherein the listing tip informs the host of potential benefits of changes to the subject listing based on search criteria that result in views of the plurality of similar listings.

* * * * *